US012586341B2

(12) United States Patent     (10) Patent No.: US 12,586,341 B2

Kapadia et al.     (45) Date of Patent: Mar. 24, 2026

(54) AUTOMATIC EXTRACTION OF SALIENT OBJECTS IN VIRTUAL ENVIRONMENTS FOR OBJECT MODIFICATION AND TRANSMISSION

(71) Applicant: Roblox Corporation, San Mateo, CA (US)

(72) Inventors: Mubbasir Turab Kapadia, San Mateo, CA (US); Ray Sun, Santa Clara, CA (US); Sean Palmer, Burbank, CA (US)

(73) Assignee: Roblox Corporation, San Mateo, CA (US)

( * ) Notice: Subject to any disclaimer, the term of this patent is extended or adjusted under 35 U.S.C. 154(b) by 283 days.

(21) Appl. No.: 18/233,793

(22) Filed: Aug. 14, 2023

(65) Prior Publication Data

US 2025/0061685 A1    Feb. 20, 2025

(51) Int. Cl.
| | |
|---|---|
| *G06V 10/46* | (2022.01) |
| *G06T 7/20* | (2017.01) |
| *G06T 7/70* | (2017.01) |
| *G06T 13/40* | (2011.01) |
| *G06T 19/20* | (2011.01) |

(Continued)

(52) U.S. Cl.
CPC .............. *G06V 10/464* (2022.01); *G06T 7/20* (2013.01); *G06T 7/70* (2017.01); *G06T 13/40* (2013.01); *G06T 19/20* (2013.01); *G06V 10/761* (2022.01); *G06V 40/171* (2022.01); *G06V 40/174* (2022.01); *G06T 2219/2004* (2013.01)

(58) Field of Classification Search
CPC .. G06V 10/464; G06V 40/174; G06V 40/171; G06V 10/761; G06T 7/70; G06T 7/20; G06T 13/40; G06T 19/20; G06T 2219/2004

See application file for complete search history.

(56) References Cited

U.S. PATENT DOCUMENTS

| | | | |
|---|---|---|---|
| 12,340,554 B1 * | 6/2025 | Jotwani | G06V 10/462 |
| 2013/0259448 A1 * | 10/2013 | Stankiewicz | G06V 10/454 |
| | | | 386/278 |

OTHER PUBLICATIONS

Admoni, et al., "Social Eye Gaze in Human-Robot Interaction: a Review", Journal of Human-Robot Interaction 6.1, 2017, pp. 25-63.

(Continued)

*Primary Examiner* — David F Dunphy

(74) *Attorney, Agent, or Firm* — IP Spring

(57) ABSTRACT

Automatic extraction of salient object properties in virtual environments for object modification and transmission. In some implementations, a computer-implemented method includes determining a reference avatar and obtaining properties of an object in the virtual environment, the properties including spatial, visual, and/or audio properties. Saliency factors of the object are determined, each saliency factor normalized to a numeric range and based on a different set of properties of the object, where one or more saliency factors are additionally based on a property of the reference avatar. A saliency measure of the object is determined with respect to the reference avatar based on a combination of the saliency factors. If the saliency measure is greater than a threshold saliency measure, the reference avatar or object are automatically modified in the virtual environment based on the object, and otherwise the modification is omitted.

20 Claims, 7 Drawing Sheets

(51) Int. Cl.
    *G06V 10/74*       (2022.01)
    *G06V 40/16*       (2022.01)

(56)             References Cited

OTHER PUBLICATIONS

Pejsa, et al., "Gaze and Attention Management for Embodied Conversational Agents", ACM Transactions on Interactive Intelligent Systems (TiiS) 5.1, 2015, pp. 1-34.
Cassell, "Embodied Conversational Agents: Representation and Intelligence in User Interfaces", AI magazine 22.4, 2001, 18 pages.
Kremer, et al., "Automatic Estimation of Parametric Saliency Maps (PSMs) for Autonomous Pedestrians", Computers & Graphics 104, 2022, pp. 86-94.
Kremer, et al., "PSM: Parametric Saliency Maps for Autonomous Pedestrians", Proceedings of the 14th ACM SIGGRAPH Conference on Motion, Interaction and Games, 2021, 7 pages.
Kremer, et al., "Watch Out! Modelling Pedestrians with Egocentric Distractions", Proceedings of the 13th ACM SIGGRAPH Conference on Motion, Interaction and Games, 2020, 10 pages.
Mind Tools Content Team, "Becoming an Active Listener", Retrieved from Internet: http://www.mindtools.com/CommSkll/ActiveListening.htm, 2023, 1 page.
Narayanan, "Improving active listening behaviours of embodied conversational agents (ECA) from a UX perspective", Degree Project in Computer Science and Engineering, Stockholm, Sweden, 2022, 19 pages.

* cited by examiner

100

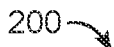
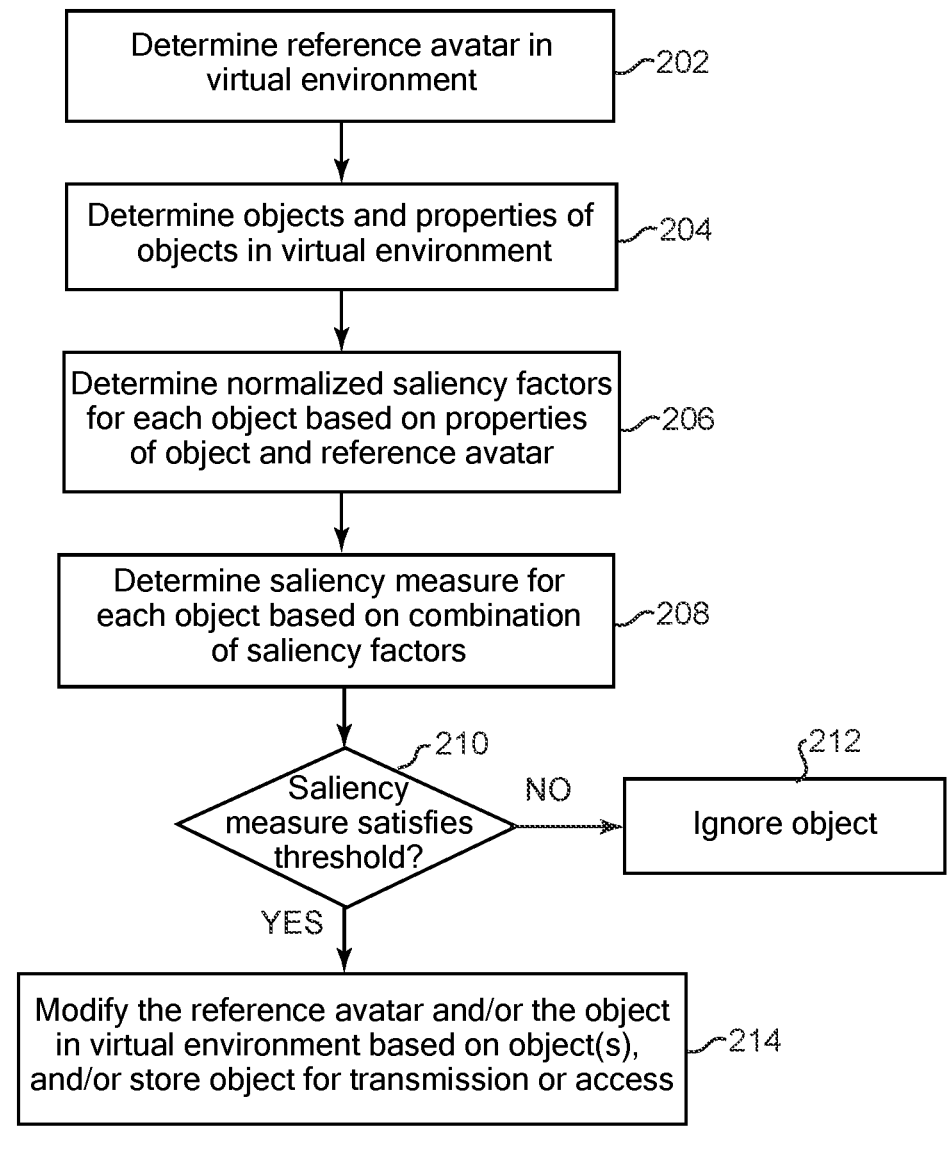
FIG. 2

300

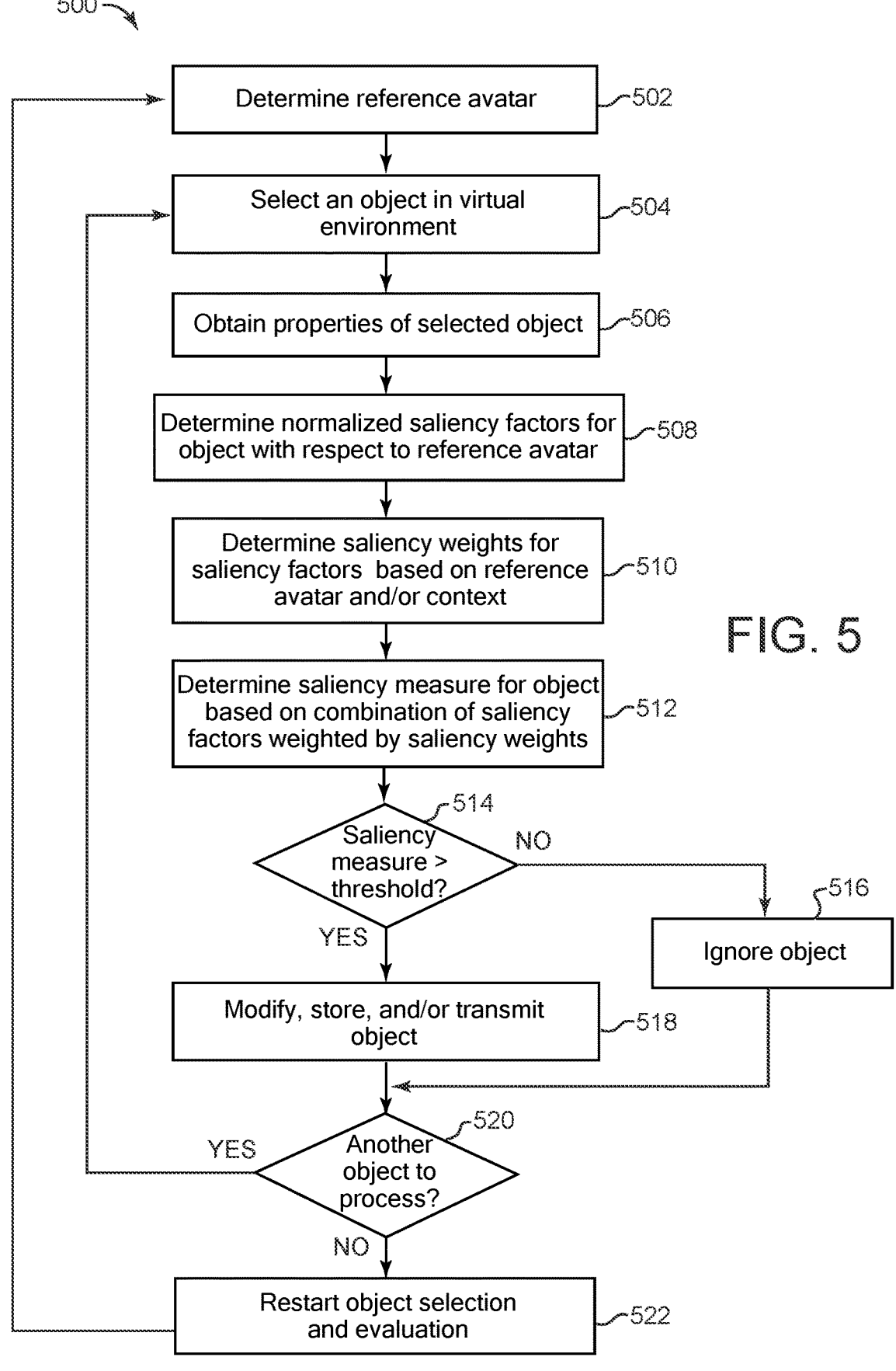

500

Determine reference avatar ~502

Select an object in virtual environment ~504

Obtain properties of selected object ~506

Determine normalized saliency factors for object with respect to reference avatar ~508

Determine saliency weights for saliency factors based on reference avatar and/or context ~510

Determine saliency measure for object based on combination of saliency factors weighted by saliency weights ~512

514
Saliency measure > threshold?          NO

YES

516
Ignore object

Modify, store, and/or transmit object ~518

520
Another object to process?

YES

NO

Restart object selection and evaluation ~522

AUTOMATIC EXTRACTION OF SALIENT OBJECTS IN VIRTUAL ENVIRONMENTS FOR OBJECT MODIFICATION AND TRANSMISSION

TECHNICAL FIELD

This disclosure relates to the field of interactive content in virtual computer environments and virtual experiences, and in particular, to methods, systems, and computer readable media for automatic detection and extraction of properties of objects in virtual environments for modification and transmission.

BACKGROUND

Virtual environments are frequently used and enjoyed by large numbers of people, in such applications as game environments (including online gaming environments), virtual worlds and experiences, and interactive online environments. Advances in machine learning have led to applications such as detection of particular content in virtual environments for a range of purposes, e.g., control of virtual objects in the virtual environment, evaluation of the virtual environment, detection of user-generated content that may be prohibited by a provider of the environment, etc.

However, current automatic detection of particular content relies on retrieval and automatic evaluation of raw data streams describing objects and other content in a virtual environment. For example, data describing the virtual environment can be obtained and analyzed, but the data describes all objects and environmental features in the virtual environment. Such large amounts of raw data retrieval and analysis creates large burdens on computer processing and network bandwidth, which limit the amount of such detection and analysis. For example, such detection and analysis is difficult to perform in real time or soon after analyzed states or actions in the virtual environment occur. Furthermore, such raw data does not inherently indicate the particular properties that are being searched for, thus requiring significant amounts of processing to detect such properties. Machine learning models may rely on complex multimodal data extracted from the underlying data model of virtual environments, e.g., data provided in different formats such as video/image data, audio data, text data, etc., but this data is retrieved with no indication of how these different modes of data are to be combined to provide detection of particular properties. Furthermore, there may be issues with security and/or anonymization of retrieved data that may include sensitive information related to users.

Accordingly, there may exist a need for detection, extraction, and transmission of objects and object properties that are relevant to tasks including modification and evaluation of objects in virtual environments, that can reduce the burden on computer processing, data bandwidth, and/or storage.

The background description provided herein is to present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatic extraction of salient objects in virtual environments for object modification, storage, and/or transmission. In some implementations, a computer-implemented method includes, by at least one processor, determining a reference avatar in a virtual environment and obtaining a plurality of properties of an object in the virtual environment. The properties include spatial properties within the virtual environment, visual properties, and/or audio properties. The method includes determining a plurality of saliency factors of the object, each saliency factor normalized to the same numeric range and based on a different set of one or more properties of the plurality of properties of the object, one or more saliency factors additionally based on one or more properties of the reference avatar. A saliency measure of the object is determined with respect to the reference avatar based on a combination of the plurality of saliency factors, and it is determined whether the saliency measure is greater than a threshold saliency measure associated with the reference avatar. In response to determining that the saliency measure is greater than the threshold saliency measure, at least one of the reference avatar or the object is automatically modified, without user input, in the virtual environment based on the object. In response to determining that the saliency measure is not above the threshold saliency measure, the modification of the at least one reference avatar or object is omitted.

Various implementations and examples of the method are described. For example, in some implementations, the object is one of a plurality of objects in the virtual environment, and the method further includes determining a respective saliency measure associated with each object of the plurality of object and comparing the saliency measures of the objects, wherein modifying the at least one of the reference avatar and the object in the virtual environment includes automatically modifying the reference avatar, by the at least one processor and without user input, in response to determining that the saliency measure is greater than the threshold saliency for the reference avatar and that the saliency measure associated with the reference avatar is the greatest of the saliency measures associated with the plurality of objects.

In some implementations, modifying the at least one of the reference avatar or the object in the virtual environment based on the object includes automatically, without user input, moving one or more portions of the reference avatar to direct a gaze of the reference avatar toward the object. In some implementations, the spatial properties include a location of the object in the virtual environment, and/or a velocity of the object in the virtual environment. In some implementations, the one or more properties of the reference avatar include a field of view of the reference avatar having an angular range and a direction.

In some implementations, the plurality of saliency factors include a saliency factor based on a distance of the object from the reference avatar when the object is in a field of view of the reference avatar, wherein the distance of the object is based on a location of the object in the virtual environment. In some implementations, the plurality of saliency factors include a saliency factor based on an orientation of the object with respect to the reference avatar when the object is in a field of view of the reference avatar; a saliency factor based on a velocity of the object in the virtual environment when the object is in a field of view of the reference avatar; a saliency factor based on include a particular visual content feature of the object when the object is in a field of view of the reference avatar; a saliency factor based on a visual content feature of the object that is a particular facial feature or particular facial expression of a face of the object, as classified by one or more machine learning models; an audio saliency factor of the object based on a particular sound or type of sound emitted by the object in the virtual environment; and/or a visual appropriateness saliency factor based on whether one or more visual content features of the object include content that is prohibited from display in the virtual environment.

In some implementations, the computer-implemented method of claim 1, wherein the saliency measure is determined based on a weighted linear combination of the plurality of saliency factors, wherein each of the plurality of saliency factors is modified by a weight customized for the reference avatar or customized for the virtual environment. In some implementations, modifying the at least one of the reference avatar or the object in the virtual environment based on the object includes automatically, without user input, moving one or more portions of the reference avatar to avoid a trajectory of the object in the virtual environment.

In some implementations, a system comprising at least one processor coupled to a memory having stored thereon software instructions that, when executed by the at least one processor, cause the at least one processor to perform operations. The operations can include determining a reference avatar in a virtual environment and obtaining a plurality of properties of an object in the virtual environment, wherein the properties include at least one of: spatial properties within the virtual environment, visual properties, or audio properties. The operations include determining a plurality of saliency factors of the object, wherein each saliency factor is normalized to the same numeric range and is based on a different set of one or more properties of the plurality of properties of the object, and one or more of the saliency factors are additionally based on one or more properties of the reference avatar. The operations include determining a saliency measure of the object with respect to the reference avatar based on a combination of the plurality of saliency factors and determining that the saliency measure is greater than a threshold saliency measure associated with the reference avatar. The operations include, in response to determining that the saliency measure is greater than the threshold saliency measure associated with the reference avatar, performing at least one selected from the group of: automatically modifying, without user input, the object in the virtual environment, storing data of the object to a storage device for transmission to or access by one or more devices, and combinations thereof. The operations include, in response to determining that the saliency measure is not above the threshold saliency measure associated with the reference avatar, omitting the modifying and the storing of the object.

Various implementations and examples of the system are described. For example, in some implementations, the one or more properties of the reference avatar include a field of view of the reference avatar having an angular range and a direction, and the plurality of saliency factors include a saliency factor based on whether the object includes a particular visual content feature when the object is in a field of view of the reference avatar. In some implementations, the plurality of saliency factors include a saliency factor based on whether one or more visual features of the object include content that is prohibited from display in the virtual environment, wherein the content is detected using one or more machine learning models. In some implementations, the plurality of saliency factors include a saliency factor based on a degree of prohibited content included in one or more visual features of the object, wherein the prohibited content is prohibited from display in the virtual environment. In some implementations, the plurality of saliency factors include an audio saliency factor based on whether a particular sound emitted from the object in the virtual environment includes audio content that is prohibited in the virtual environment.

In some implementations, a non-transitory computer-readable medium with instructions stored thereon that, when executed by a processor, cause the processor to perform operations including determining a reference avatar in a virtual environment and obtaining a plurality of properties of an object in the virtual environment. The properties include spatial properties within the virtual environment, visual properties, and/or audio properties. The operations include determining a plurality of saliency factors of the object, each saliency factor normalized to the same numeric range and based on a different set of one or more properties of the plurality of properties of the object, one or more saliency factors additionally based on one or more properties of the reference avatar. The operations include determining a saliency measure of the object with respect to the reference avatar based on a combination of the plurality of saliency factors, and determining whether the saliency measure is greater than a threshold saliency measure associated with the reference avatar. In response to determining that the saliency measure is greater than the threshold saliency measure, the operations include automatically modifying, without user input, at least one of the reference avatar or the object in the virtual environment based on the object. The operations include, in response to determining that the saliency measure is not above the threshold saliency measure, omitting the modification of the at least one reference avatar or object.

Some implementations may include a computer-implemented method that includes operations performed by a processor of a system or computer-readable medium described above. Some implementations may include a system that includes a processor and a memory coupled to the processor. The memory may have instructions stored thereon that, when executed by the processor, cause the processor to perform operations that include one or more of the features of the methods or computer-readable medium described above. Some implementations may include a non-transitory computer-readable medium with instructions stored thereon that, when executed by a processor, cause the processor to perform operations that can be similar to features of the methods and/or systems described above.

BRIEF DESCRIPTION OF THE DRAWINGS

FIG. 2 is a block diagram of an example method to automatically extract salient object properties of objects in virtual environments and modify and/or store objects based on those properties, in accordance with some implementations.

FIG. 5 is a flow diagram of an example method to automatically extract salient objects in virtual environments to detect, modify, and/or store objects, in accordance with some implementations.

DETAILED DESCRIPTION

Figure 1:
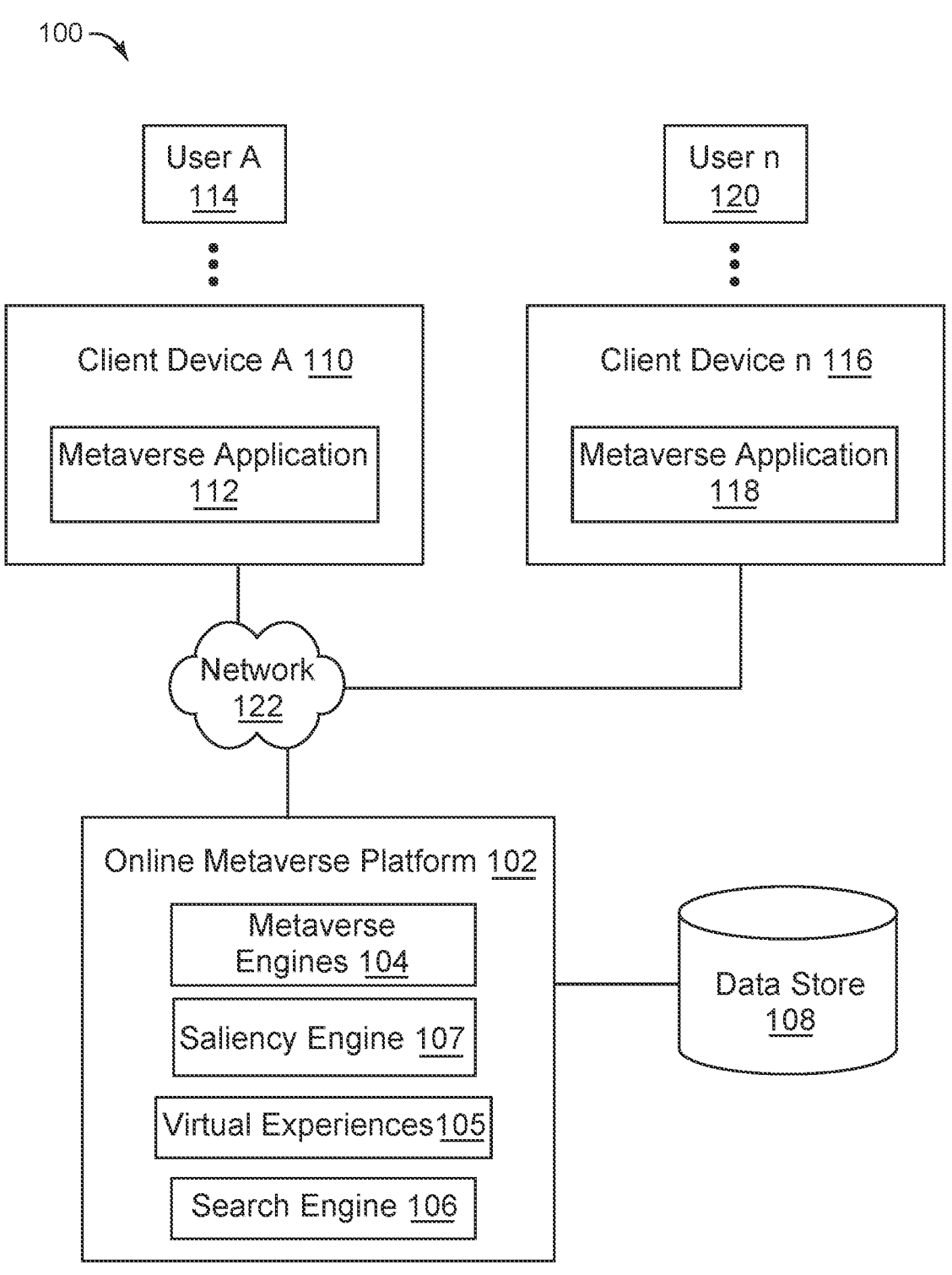
FIG. 1 is a diagram of an example system architecture, in accordance with some implementations.

One or more implementations described herein relate to automatic extraction of salient objects in virtual environments for object modification, storage, and/or transmission. A computer-implemented process automatically obtains properties of an object in a virtual environment with reference to a reference avatar, including object properties such as spatial properties in the virtual environment, visual properties, audio properties, etc. Multiple saliency factors are determined for the object with respect to the reference avatar, each saliency factor being normalized to the same numeric range and is based on a different set of one or more properties of the object. A saliency measure of the object is determined with respect to the reference avatar based on a combination of the saliency factors. If the saliency measure is above a threshold saliency measure, e.g., associated with the reference avatar, the reference avatar and/or the object is modified in the virtual environment based on one or more of the object properties. In some implementations, data of the object (e.g., including the object and/or object properties) and/or data of the reference avatar are stored and transmitted for access by one or more users.

Various features include automatically modifying the reference avatar, without user input, to move, e.g., to shift its gaze toward the object, if the object is determined to have the highest saliency among multiple objects in the virtual environment. Some implementations can modify the object; for example, if prohibited or inappropriate data of the object is detected and determined to be salient, the data can be removed. Some implementations can store and/or transmit salient object data for access by other users (e.g., moderators) or system that can evaluate the object.

Features described herein provide improved and computationally efficient detection of salient features of objects in a virtual environment and subsequent processing of objects from that environment. The objects can include avatars and other objects. For example, described techniques can be used in systems for automated avatar control (e.g., attention models), run-time detection of objects, moderation of prohibited or inappropriate user-generated content and user behavior, abuse report generation, and for providing data features to train machine learning models for detection of objects and content and generation of same. Described techniques can provide actionable insights into user-generated content and user behavior in virtual environments.

Described features provide several advantages over previous techniques for salient object detection, control of avatars, content extraction and moderation, training machine learning systems for detection and generation, etc., that rely on complex multimodal data extracted from an underlying data model of virtual environments.

For example, complex, multimodal data may be difficult to interpret, e.g., which may include different types of data such as video (and/or different parts of a video channel), audio (and/or different parts of an audio channel), animation, visual appearance, data describing user activity and input in the virtual environment, etc. Described techniques and systems allow complex features to be evaluated in detecting, providing, and modifying objects and other content. For example, modifying avatar gaze based on an object in a virtual environment can be based on complex data features that include spatial features, visual features, audio features, etc. of the object. For example, properties of such data features can be combined by described techniques to determine saliencies of objects to avatars. Described saliency techniques can also be used to control other aspects of an avatar based on context and environment described by multimodal data. Furthermore, in previous systems, lack of domain knowledge could prevent relevant data from being determined and used in object detection, since various virtual environment modalities (e.g., 3D assets, textures, audio, animation, etc.) have their own unique domain-specific knowledge to be leveraged for data feature extraction. In contrast, using described techniques, users can define their own sets of saliency features suited for particular domains known to the users.

Described saliency techniques can detect and determine only salient objects and object properties that can be used for avatar and object modification and processing, allowing efficient extraction of relevant multimodal information that is expressive and compact (compressed) for downstream tasks. This is in contrast to previous techniques that obtained raw data (e.g., all objects and other data) from a virtual environment for evaluation. Described features allow much smaller amounts of data to be stored and transmitted over limited network bandwidth compared to obtaining raw data, thus greatly increasing efficiency of processing. For example, the memory footprint of extracted salient objects can be orders of magnitude smaller compared to a raw data technique. Furthermore, added processing is required in previous systems to detect relevant data features in a raw data stream, in contrast to the provision of data features already determined to be relevant in described techniques. Furthermore, the efficient processing, storage, and transmission of described techniques enables efficient, real-time telemetry of virtual environment features compared to obtaining raw data of the virtual environment and/or rendering of a user's view of the virtual environment on a client device.

In addition, described saliency techniques provide advantages for data privacy. Previous techniques store raw data that may be indicative of user behavior which is subject to privacy concerns, and may include issues with anonymization and whether information is to be processed or stored on servers and not on a user's client device. In contrast, described techniques can extract only salient data from streams of data that is relevant for downstream tasks, greatly reducing the amount of data subject to privacy concerns. The reduced set of salient data also provides reduced likelihood of the data being hijacked or hacked by users. Derived saliency features are also more easily anonymized to preserve user privacy, due to the reduced amount of evaluated data.

In addition, described saliency techniques allow a greater amount of client-side processing, and/or reduced amount of server-side processing, of detected data due to the reduced amount of data compared to raw data that is typically processed on a server. Use of transmission bandwidth can be reduced compared to techniques transmitting raw data for processing. Using previous techniques, client-side feature extraction and telemetry of time-series data may be prohibitively expensive for the available memory and compute resources of the client device.

Described techniques can also be used to detect objects that include prohibited or inappropriate user-generated content in a virtual environment, e.g., content that is prohibited by a provider of the virtual environment. Using described techniques, salient data features including object properties can be transmitted to human or system moderators that can examine this relevant data and do not have to evaluate much larger amounts of raw data, thus saving network bandwidth, processing, and storage of the server and client devices providing the data. Also, in some previous systems, a user may be required to input an abuse report for inappropriate content viewed by that user. Described techniques can avoid this burden on users by automatically providing such reports without user input (including using detection bots to automatically capture objects in an environment and provide reports as described below).

Described techniques also allow view-dependent data feature extraction. Extracted data features may depend on the field of view of a certain sensor (e.g., the view of a user-controlled avatar). For example, in some cases, inappropriate content may be detected only when viewing it within a virtual environment and/or when viewing it from particular viewpoints in the virtual environment. For example, particular user-generated content data may not appear inappropriate when viewed in isolation, but would be considered inappropriate when viewed in a multimodal format in the virtual environment that includes visual, audio, animation, and/or other components (e.g., avatar gestures or movements).

Described techniques also allow the use of saliency-driven avatars as detection bots. Such detection bots can be virtual agents that explore virtual environments and can be guided by saliency factors of described techniques to automatically detect and record particular objects or environments, including inappropriate content or activity in the virtual environment. The bot can provide telemetry data including captured objects and activity, which may include only salient data features to reduce storage, processing, and bandwidth needs and thus allows transmission and processing of captured data in real time.

Described techniques can also be used to provide salient data features to train a machine learning model, e.g., a machine learning neural network. Saliency factors and salient objects and object properties of described techniques can be directly input to the model as derived features from raw data, and the machine learning model does not have to perform processing of raw data and identify the features itself, allowing the model to be more lightweight and saving processing and memory resources.

Described techniques can provide customizable saliency factors for customizable determination of saliency features. Developers (including user creators) of virtual environments can determine object properties that are salient for a particular avatar and/or virtual environment. Developers, creators, players, and other end users (e.g., moderators) can customize which salient features are extracted and how they are aggregated to suit application-specific needs. Customizable perception models (e.g., based on avatar viewpoint) can support view-dependent feature extraction. User-defined saliency measures allow users to define the salient features that are to be extracted from the virtual environment and from associated user activity patterns.

Described techniques can detect, process, store, and transmit reduced amounts of relevant data compared to previous techniques that may require significant processing resources to obtain and process raw data. Described features provide technical advantages that enable reduction of use of computational resources (e.g., computer memory, processor use and time, networking traffic bandwidth, etc.) in various described implementations.

FIG. 1 illustrates an example system architecture 100, in accordance with some implementations of the disclosure. System architecture 100 is provided for illustration. In some implementations, the system architecture 100 may include the same, fewer, more, or different elements configured in the same or different manner as that shown in FIG. 1. System architecture 100 (also referred to as "system" herein) includes an online metaverse platform 102, a first client device 110 (generally referred to as "client devices 110/116" herein), a network 122, and a second client device 116. The online metaverse platform 102 can include, among other things, a metaverse engine 104, one or more virtual experiences 105, a search engine 106, a saliency engine 107, and a data store 108. The client device 110 can include a metaverse application 112. The client system 116 can include a metaverse application 118. Users 114 and 120 can use client devices 110 and 116, respectively, to interact with the online metaverse platform 102.

The term "virtual experience" or "game," as used herein, refers to any virtual experience in a computer (virtual) environment, including games with specified objectives or end states, as well as other types of games or virtual experiences provided for user(s) in a virtual environment such as training, tourism, activity simulation, concerts, meetings, virtual gatherings, etc. that may not have a specific objective or end state. The virtual experience may include one or more avatars (e.g., character models). An avatar may be controlled by a human user, or may be a computer-generated avatar (e.g., a non-player character controlled by a game or other virtual experience). In various implementations, an avatar may be a humanoid, an animal form, a vehicle form, or in any other form. In some implementations, the avatar may include a mesh (a set of points arranged in 3D space to obtain an avatar with body parts such as head, torso, limbs, etc.). Further, in some implementations, one or more textures may be attached to a mesh. A texture may define various visual appearances, such as avatar skin parameters, clothing, etc., and can include color, reflectivity, shape, etc. In various implementations, avatar animation may be performed automatically by metaverse engine 104 and/or by metaverse applications (112, 118).

A metaverse platform, as described herein, may include any platform that provides one or more virtual experiences in a virtual environment or metaverse. A metaverse application, as described herein, may include any application that enables a user to participate in a virtual experience (e.g., game, etc.), and engage in virtual activity or gameplay, including configuring an avatar, moving about in 3D space (of a virtual environment), performing actions, engaging with other avatars, interacting with other users via text/audio/video chat, etc.

Online metaverse platform 102 (also referred to as "user-generated content platform" or "user-generated content system") can offer a variety of ways for users to interact with one another. For example, users of an online metaverse platform may play games or other virtual experiences that are provided by the platform, e.g., games that include player-controlled characters (avatars), non-player characters (avatars), and other virtual objects and mechanisms. Some online metaverse platforms can provide a variety of different environments (e.g., two dimensional or virtual three-dimensional environments) in which users can play in online virtual experiences. In some implementations, users of an online metaverse platform may create games, environments, or other content or resources (e.g., avatars, other objects, graphics, items for game play within a virtual environment, etc.) within the metaverse platform. Users of an online metaverse platform may work together towards a common goal in a game or in game creation, share various virtual metaverse items, send electronic messages to one another, and so forth. An online metaverse platform may also allow users of the platform to communicate with each other, e.g., using voice messages (e.g., via audio voice chat), text messaging, video messaging, or a combination of the above.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online metaverse platform 102 can include a server having one or more computing devices (e.g., a cloud computing system, a rackmount server, a server computer, cluster of physical servers, virtual server, etc.). In some implementations, a server may be included in the online metaverse platform 102, be an independent system, or be part of another system or platform.

In some implementations, the online metaverse platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online metaverse platform 102 and to provide a user with access to online metaverse platform 102. The online metaverse platform 102 may also include a website (e.g., one or more webpages) or application back-end software that may be used to provide a user with access to content provided by online metaverse platform 102. For example, users may access online metaverse platform 102 using the metaverse application 112/118 on client devices 110/116, respectively.

In some implementations, online metaverse platform 102 may be a type of social network providing connections between users or a type of user-generated content system that allows users (e.g., end-users or consumers) to communicate with other users via the online metaverse platform 102, where the communication may include voice chat, video chat, or text chat. In some implementations of the disclosure, a "user" may be represented as a single individual person. However, other implementations of the disclosure encompass a "user" (e.g., creating user) being an entity controlled by a set of users or an automated source. For example, a set of individual users federated as a community or group in a user-generated content system may be considered a "user." In some implementations, a "user" can include one or more programs or virtual entities, as well as persons that interface with the system or network.

In some implementations, online metaverse platform 102 may include a virtual gaming platform. For example, the gaming platform may provide single-player or multiplayer games (and other virtual environments) to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games or environments, or augmented reality (AR) games, for example. In some implementations, games can include environments which may not have game goals, e.g., simulators of particular actions or environments which a player can explore and/or interact with. In some implementations, users may search for games and participate in gameplay with other users in one or more games selected from results of the search. In some implementations, a game selected from results of the search may be played in real-time with other users of the game. In some implementations, gameplay may refer to interaction of one or more players using client devices (e.g., 110 and/or 116) within a virtual experience (e.g., 105) or the presentation of the interaction on a display or other output device of a client device 110 or 116.

In some implementations, other platforms can be used with the techniques described herein instead of or in addition to online metaverse platform 102. For example, a social networking platform, purchasing platform, messaging platform, creation platform, etc. can be used to detect and provide salient data features and modify objects based thereon.

One or more virtual experiences 105 are provided by the online metaverse platform. In some implementations, a virtual experience 105 can include an electronic file that can be executed or loaded using software, firmware or hardware configured to present the virtual experience content (e.g., digital media item) to an entity. In some implementations, a metaverse application 112/118 of a virtual experience may be executed and one or more virtual experience instances can be rendered in connection with a virtual experience 105 and metaverse engine 104. In some implementations, a virtual experience 105 may have a common set of rules and/or common goal, and the environments of a virtual experience share the common set of rules and/or common goal. In some implementations, different virtual experiences 105 may have different rules or goals from one another.

In some implementations, virtual experiences 105 may have one or more environments (also referred to as "computer environments," "gaming environments," or "virtual environments" herein) where multiple environments may be linked. An example of an environment may be a three-dimensional (3D) environment. The one or more environments of a game may be collectively referred to a "world" or "gaming world" or "virtual world" or "universe" herein. An example of a world may be a 3D world of a game. For example, a user may build a virtual environment that is linked to another virtual environment created by another user. An avatar in the virtual game may cross the virtual border of one virtual environment to enter an adjacent virtual environment.

It may be noted that 3D environments or 3D worlds use graphics that use a three-dimensional representation of geometric data representative of virtual experience content (or at least present such content to appear as 3D content whether or not 3D representation of geometric data is used). 2D environments or 2D worlds use graphics that use two-dimensional representation of geometric data representative of virtual experience content.

In some implementations, the online metaverse platform 102 can host one or more virtual experiences 105 and can permit users to interact with the virtual experiences 105 (e.g., create, modify, search for, request, and/or join a virtual experience 105, virtual experience instances of virtual experience 105, virtual experience-related content, or other content) using a metaverse application 112/118 of client devices 110/116. Users (e.g., 114 and/or 120) of the online metaverse platform 102 may play, create, interact with, or build virtual experiences 105, search for virtual experiences 105, communicate with other users, create and build objects (e.g., also referred to as "item(s)" or "virtual experience objects" or "virtual experience item(s)" herein) of virtual experiences 105, and/or select or search for objects. For example, when generating user-generated virtual items, users may create avatars, attributes or actions for the created avatars, decoration for the avatars, one or more virtual environments for an interactive virtual experience, or build structures used in a virtual experience, among others. In some implementations, users may buy, sell, or trade virtual experience objects, such as in-platform currency (e.g., virtual currency), with other users of the online metaverse platform 102. In some implementations, online metaverse platform 102 may transmit virtual experience content to metaverse applications (e.g., 112). In some implementations, virtual experience content (also referred to as "content" herein) may refer to any data or software instructions (e.g., virtual experience objects, virtual environment and features therein, virtual experience, user information, video, images, commands, media item, etc.) associated with online metaverse platform 102 or metaverse applications. In some implementations, virtual experience objects (e.g., also referred to as "item(s)" or "objects" or "virtual experience item(s)" herein) may refer to objects that are used, created, shared or otherwise depicted in virtual experiences 105 of the online metaverse platform 102 or metaverse applications 112 or 118 of the client devices 110/116. For example, virtual experience objects may include a part, model, avatar, tools, weapons, clothing, buildings, vehicles, currency, flora, fauna, components of the aforementioned (e.g., windows of a building), and so forth.

In some implementations, a user can create or modify a computer model that is a virtual experience object, such as an avatar (e.g., character model) used in one or more virtual experiences. For example, the user can create or modify a skeleton, shape, surface texture and color, and/or other attributes of an avatar. In some examples, an avatar can be similar to a human body model, e.g., can have any of a head, torso/abdomen, arms, legs, hands, feet, joints, etc. and can move similarly to a human body (e.g., walk, run, jump, turn head, move arms, etc.). In some cases, the avatar can have fewer joints than a human body, and in other cases, the avatar can have all joints or more joints than a human body.

In some implementations, an avatar can be animated by a user, e.g., instructed to move within a computer generated environment. For example, instructions can be provided to move one or more parts of the avatar (e.g., parts corresponding to limbs or body parts of a human) to one or more different poses, each pose providing particular joint angles for joints of the avatar. The instructions to move the model can be provided from a user in an editor interface, e.g., the user commanding the movement via input in the interface. In some cases, the instructions can be provided from storage and can include a sequence of poses for the avatar.

It may be noted that the online metaverse platform 102 is provided for purposes of illustration, rather than limitation.

In some implementations, a virtual experience 105 may be associated with a particular user or a particular group of users (e.g., a private virtual experience), or made widely available to users of the online metaverse platform 102 (e.g., a public virtual experience). In some implementations, where online metaverse platform 102 associates one or more virtual experiences 105 with a specific user or group of users, online metaverse platform 102 may associate the specific user(s) with a virtual experience 105 using user account information (e.g., a user account identifier such as username and password).

In some implementations, online metaverse platform 102 or client devices 110/116 may include metaverse engines 104 or metaverse application 112/118. In some implementations, the metaverse engines 104 can include a metaverse application similar to metaverse application 112/118. In some implementations, metaverse engines 104 may be used for the development and/or execution of virtual experiences 105. For example, metaverse engines 104 may include a rendering engine ("renderer") for 2D, 3D, VR, or AR graphics, a physics engine, a collision detection engine (and collision response), sound engine, scripting functionality, artificial intelligence engine, networking functionality, streaming functionality, memory management functionality, threading functionality, scene graph functionality, or video support for cinematics, among other features.

Metaverse platform 102 may also include a saliency engine 107 that can interface with metaverse engines 104 and virtual experiences 105 and can detect and extract object properties from virtual environments of virtual experiences 105. Object properties that are salient to modification, storage, and/or transmission of objects are efficiently extracted and determined via saliency factors. Salient object data can be stored in data store 108 and/or transmitted to client devices 110 and 116 as described herein. Example methods which can be implemented by saliency engine 107 are described below with reference to FIGS. 2-5.

The components of the metaverse engines 104 may generate commands that help compute and render a virtual experience instance of a virtual experience 105 (e.g., rendering commands, collision commands, physics commands, etc.). In some implementations, metaverse applications 112/118 of client devices 110/116, respectively, may work independently, in collaboration with metaverse engine 104 of online metaverse platform 102, or a combination of both.

In some implementations, both the online metaverse platform 102 and client devices 110/116 execute a metaverse engine (104, 112, and 118, respectively). The online metaverse platform 102 using metaverse engine 104 may perform some or all the metaverse engine functions (e.g., generate physics commands, rendering commands, etc.), or offload some or all the metaverse engine functions to metaverse applications 112 and 118 of client devices 110 and 116, respectively. In some implementations, each virtual experience 105 may have a different ratio between the metaverse engine functions that are performed on the online metaverse platform 102 and the metaverse engine functions that are performed on the client devices 110 and 116. For example, a metaverse engine 104 of the online metaverse platform 102 may be used to generate physics commands in cases where there is a collision between at least two game objects, while the additional metaverse engine functionality (e.g., generate rendering commands) may be offloaded to the client device 110. In some implementations, the ratio of metaverse engine functions performed on the online metaverse platform 102 and client device 110 may be changed (e.g., dynamically) based on virtual environment or gameplay conditions. For example, if the number of users participating in gameplay of a virtual experience 105 exceeds a threshold number, the online metaverse platform 102 may perform one or more metaverse engine functions that were previously performed by the client devices 110 or 116.

For example, players may be playing in a virtual experience instance of virtual experience 105 on client devices 110 and 116, and may send control instructions (e.g., user inputs, such as directional inputs of right, left, up, down, avatar position and velocity information, text, voice input, etc.) to the online metaverse platform 102. Subsequent to receiving control instructions from the client devices 110 and 116, the online metaverse platform 102 may send instructions (e.g., position and velocity information of the avatars participating in the group gameplay or commands, such as rendering commands, collision commands, etc.) to the client devices 110 and 116 based on control instructions. For instance, the online metaverse platform 102 may perform one or more logical operations (e.g., using metaverse engine 104) on the control instructions to generate gameplay instruction for the client devices 110 and 116. In other instances, online metaverse platform 102 may pass one or more or the control instructions from one client device 110 to other client devices (e.g., 116) participating in the virtual experience instance. The client devices 110 and 116 may use the gameplay instructions and render the gameplay for presentation on the displays of client devices 110 and 116.

In some implementations, the control instructions may refer to instructions that are indicative of actions of a user's avatar in a virtual environment. For example, control instructions may include user input to control the action, such as right, left, up, down, user selection, gyroscope position and orientation data, force sensor data, text, voice input, etc. The control instructions may include avatar position and velocity information. In some implementations, the control instructions are sent directly to the online metaverse platform 102. In other implementations, the control instructions may be sent from a client device 110 to another client device (e.g., 116), where the other client device generates control instructions using the local metaverse application 118. The control instructions may include instructions to play a voice communication message or other sounds from another user on an audio device (e.g., speakers, headphones, etc.).

In some implementations, control instructions may refer to instructions that allow a client device 110 (or 116) to render play experience of a virtual experience in a virtual experience instance. The control instructions may include one or more of user input, avatar position and velocity information, or commands (e.g., physics commands, rendering commands, collision commands, etc.).

In some implementations, the control instructions can cause an animation associated with a virtual object, such as an avatar, to be played in the virtual experience. For example, control instructions can include a direct command to play an animation that causes the avatar to move (e.g., walk, jump, swing arms, dance, etc.). In some examples, control instructions that move an avatar may cause an animation of the avatar to commence based on interactions of the avatar with the virtual environment. For example, the avatar being moved off a ledge can cause a falling animation to be played for the avatar.

In some implementations, virtual objects (e.g., avatars, characters, other objects) are constructed from components, one or more of which may be selected by the user, that automatically join together to aid the user in editing. One or more avatars (also referred to as a "character," or "character model" herein) may be associated with a user where the user may control the avatar when playing a virtual experience 105 to facilitate the player's interaction with the virtual experience 105. In some implementations, an avatar may include components such as body parts (e.g., hair, arms, legs, etc.) and accessories (e.g., t-shirt, glasses, decorative images, tools, etc.). In some implementations, body parts of avatars that are customizable by a player include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, a player may control the scale (e.g., height, width, or depth) of an avatar or the scale of components of an avatar. In some implementations, the player may control the proportions of an avatar (e.g., blocky, anatomical, etc.). It may be noted that is some implementations, an avatar may not include a rendered avatar object (e.g., character model, etc.) but the user may control the avatar (without the avatar object) to facilitate the player's interaction with the game (e.g., a puzzle game where there is no rendered avatar object, but a player user controls an avatar to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creation and editing module and interface of metaverse application 112/118 (or virtual experience engines 104) may publish a user's avatar for view or use by other users of the online metaverse platform 102. In some implementations, creating, modifying, or customizing avatars, other virtual experience objects, virtual experiences 105, or virtual environments may be performed by a user using a user interface (e.g., developer interface) and with or without scripting (or with or without an application programming interface (API)). For example, a developer interface can be displayed by a client device 110 and the user at the client device can select user interface commands to create and/or modify objects (including avatars), environments, and scripts for a virtual experience. It may be noted that for purposes of illustration, rather than limitation, avatars are described as having a humanoid form. It may further be noted that avatars may have any form such as a vehicle, animal, inanimate object, or other creative form.

In some implementations, the online metaverse platform 102 may store avatars (e.g., characters) created by users in the data store 108. In some implementations, the online metaverse platform 102 maintains an avatar catalog and virtual experience catalog that may be presented to users via a user interface. In some implementations, the virtual experience catalog includes images of virtual experiences stored on the online metaverse platform 102. In addition, a user may select an avatar (e.g., an avatar created by the user or other user) from the avatar catalog to participate in the chosen virtual experience. The avatar catalog includes images of avatars stored on the online metaverse platform 102. In some implementations, one or more of the avatars in the avatar catalog may have been created or customized by the user, and/or created or customized by other users. In some implementations, the chosen avatar may have avatar settings defining one or more of the components of the avatar. In some implementations, some avatars or portions of avatars (and/or data associated with the avatars) can be stored locally to client devices 110/116.

In some implementations, a user's avatar can include a configuration of components, where the configuration and appearance of components and more generally the appearance of the avatar may be defined by avatar settings. In some implementations, the avatar settings of a user's avatar may at least in part be chosen by the user. In other implementations, a user may choose an avatar with default avatar settings or avatar setting chosen by other users. For example, a user may choose a default avatar from an avatar catalog that has predefined avatar settings, and the user may further customize the default avatar by changing some of the avatar settings (e.g., adding a shirt with a customized logo). The avatar settings may be associated with a particular avatar by the online metaverse platform 102.

Avatar settings can also include one or more animations associated with an avatar. An animation, when played, causes the avatar to move within the environment and/or move particular body parts or other physical features of the avatar. Each animation includes a sequence of multiple poses which the avatar assumes in a virtual environment to cause the avatar to move or be otherwise changed in physical (displayed) appearance. For example, some animations can cause the avatar to have a particular facial expression (e.g., smile, frown, yell, laugh, etc.). Some animations can cause the one or more of the avatar's body components to move in a particular manner, e.g., to cause the avatar to nod or otherwise move its head, to walk, run, dive to the ground, jump, stagger, hop, roll on the ground, somersault, perform exercises, shake the head from side to side, shrug shoulders, etc. An avatar can be associated with multiple animations, and one or more of the animations can be designated by a user (e.g., using a developer interface of metaverse application 112/118 or metaverse engines 104) to trigger and be played based on respective particular condition(s). Some animations can be designated to play for the avatar in response to a user command during the virtual experience, such as an action to move the avatar in the virtual environment, act on a different object in the virtual environment, a specific command to play the particular animation, etc.

In some implementations, online metaverse platform 102 may include a search engine 106. In some implementations, the search engine 106 may be a system, application, or module that permits the online metaverse platform 102 to provide search functionality to users, where the search functionality permits the users to search virtual experiences 105 that are available, the most popular virtual experiences, virtual experience instances that are looking for players, virtual experience assets available on the metaverse platform 102, etc.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online metaverse platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the metaverse application 112 or 118, respectively. In one implementation, the metaverse application 112 or 118 may permit users to use and interact with online metaverse platform 102, such as search for a virtual experience or other content, control a virtual avatar in a virtual experience hosted by online metaverse platform

102, or view or create or upload content, such as virtual experiences 105, images, avatars, and other objects, model animations, videos, web pages, documents, and so forth. In one example, the metaverse application may be a web application (e.g., an application that operates in conjunction with a web browser) that can access, retrieve, present, or navigate content (e.g., virtual avatar in a virtual environment, etc.) served by a web server. In another example, the metaverse application may be a native application (e.g., a mobile application, app, or a gaming program) that is installed and executes local to client device 110 or 116 and allows users to interact with online metaverse platform 102. The metaverse application may render, display, or present the content (e.g., a web page, a media viewer) to a user. In an implementation, the metaverse application may also include an embedded media player (e.g., a Flash® player) that is embedded in a web page.

According to aspects of the disclosure, the metaverse application 112/118 may be an online metaverse platform application for users to build, create, edit, upload content to the online metaverse platform 102 as well as interact with online metaverse platform 102 (e.g., play virtual experiences 105 hosted by online metaverse platform 102). As such, the metaverse application 112/118 may be provided to the client device 110 or 116 by the online metaverse platform 102. In another example, the metaverse application 112/118 may be an application that is downloaded from a server.

In some implementations, a user may login to online metaverse platform 102 via the metaverse application. The user may access a user account by providing user account information (e.g., username and password) where the user account is associated with one or more avatars available to participate in one or more virtual experiences 105 of online metaverse platform 102.

In general, functions described in one implementation as being performed by the online metaverse platform 102 can also be performed by the client device(s) 110 or 116, or a server, in other implementations if appropriate. In addition, the functionality attributed to a particular component can be performed by different or multiple components operating together. The online metaverse platform 102 can also be accessed as a service provided to other systems or devices through appropriate application programming interfaces (APIs), and thus is not limited to use in websites.

FIG. 2 is a block diagram illustrating an example method 200 to automatically extract salient object properties of objects in virtual environments and modify and/or transmit objects based on those properties, in accordance with some implementations. In some implementations, method 200 can be implemented, for example, on a server system, e.g., online metaverse platform 102 as shown in FIG. 1. In some implementations, method 200 can be performed by a virtual experience engine 104 and saliency engine 107 of online metaverse platform 102. In some implementations, some or all of the method 200 can be implemented on a system such as one or more client devices 110 and 116 as shown in FIG. 1, and/or on both a server system and one or more client systems. In described examples, the implementing system includes one or more processors or processing circuitry, and one or more storage devices such as a database, data structure, or other accessible storage. In some implementations, different components of one or more servers and/or clients can perform different blocks or other parts of the method 200. Method 200 may begin at block 202.

In block 202, a reference avatar in a virtual environment is determined for which a saliency measure is to be determined with respect to one or more objects in the virtual environment. In some implementations, the reference avatar can be an object such as a character model provided in a virtual environment, e.g., a game environment or other virtual environment. For example, the reference avatar can appear as a 3D model in a 3D virtual environment, or appear as a 2D model, bitmap, or sprite in a 2D virtual environment, representing a person, animal, vehicle, etc., that includes visual textures including pixels providing a visual appearance. In some implementations, the reference avatar has a location in the virtual environment but is not represented by a character model or other object and does not appear in the virtual environment, or may be invisible in the virtual environment. For example, a user in a virtual experience may view a virtual environment from a particular location of the reference avatar in that environment, without having an avatar object visually rendered in the environment. The reference avatar has one or more properties such as a particular size, location within the virtual environment, orientation or facing, field of view, and/or other properties.

In some examples, the reference avatar represents and is controlled by a user, e.g., a user or player in a game or other virtual experience, so that the user can, e.g., cause the reference avatar to move by inputting directional commands to the virtual experience, to perform actions by inputting other commands to the virtual experience, etc. In further examples, the reference avatar may not be controlled by any human user, e.g., may be a non-player character or other object in a game or other virtual experience. Block 202 may be followed by block 204.

In block 204, one or more objects in the virtual environment and properties of those objects are obtained. The objects can be any objects in the virtual environment in which the reference avatar is located, e.g., in the same virtual world, virtual environment, or area of a virtual environment. For example, the objects can be other avatars (user-controlled or not user-controlled), scenery or environmental objects, etc.

The objects in the virtual environment have one or more detected and extracted properties. The object properties that are detected and extracted can depend on which saliency factors are being determined in the current implementation, as described below.

In some implementations, object properties can include spatial properties within the virtual environment, e.g., location, orientation or facing, velocity and/or acceleration, etc. within the virtual environment. In some implementations, object properties can include visual properties including textures, shape properties (e.g., meshes), and/or other data providing visual appearance of the object. In some implementations, properties can include visual content properties of the object classified by machine learning models, image processing techniques, expert systems, or other techniques based on textures, shape properties, etc. For example, visual content properties can include facial properties, facial accessories, and/or facial expressions for objects (such as avatars); body properties of objects representing human-like (humanoid) characters, including size and body weight classification, clothing, etc.; body positions, poses, and/or movements/animations of objects representing humanoid characters; etc.

In some implementations, object properties can include audio properties that include sounds emitted by an object in a virtual environment (e.g., based on digital audio data), such as speech, sound effects, etc. In some implementations, object properties can include text content, such as text that has input by a user in a virtual environment. Classified properties (e.g., recognized types of sounds, semantic labels for text, etc.) can be detected and classified similarly as described for visual content properties, e.g., using digital signal processing techniques for audio data, etc. In some implementations, object properties can include the presence of one or more tags associated with the object, where each tag can include (e.g., be associated with) data or content, such as a descriptive label that includes text, image, audio, etc.

In some implementations, object properties can include whether the object includes (e.g., is associated with) inappropriate or prohibited user-generated data (e.g., inappropriate content prohibited by a provider of the virtual environment), or a degree of inappropriate data included in the object. In some implementations, some properties can be detected and recognized using machine learning models trained to detect positions, movements, image features, audio features, text features, etc., other image or audio recognition and digital signal processing techniques, and/or rules-based expert systems that can detect types of properties. Various examples of object properties are described below with reference to FIGS. 3-5. Block 204 may be followed by block 206.

In block 206, a set of multiple normalized saliency factors are determined for each object based on properties of the object determined in block 204 and, for example, one or more properties of the reference avatar. In some examples, egocentric saliency factors can be determined relative to or at least partially based on one or more properties of the reference avatar, and allocentric saliency factors can be independent of the properties of the reference avatar. An object's saliency factors indicate whether, or a degree to which, the object is salient, e.g., of relevance or importance, to the reference avatar. For example, movement saliency of an object can be estimated based on the relative motion of the object with respect to the reference avatar.

In some implementations, each saliency factor can be expressed as a numerical value within a range of values. For example, each saliency factor for an object can be normalized to be a saliency value within the same numerical range that is used for all the saliency factors of that object, and in some implementations can be the same numerical range used for saliency factors of all the objects in the virtual environment. In some examples, the numerical range can be from 0 to 1, or can be a different range in other implementations.

Saliency factors can be determined based on properties of the object obtained in block 204, such as spatial properties, visual properties, audio properties, and/or any other properties obtained in block 204. Each saliency factor can be based on a different set of the one or more properties of the object determined in block 204. In some implementations, one or more saliency factors can be determined based on one or more object properties and additionally based on one or more properties of the reference avatar determined in block 202. For example, the reference avatar may have a field of view that covers a particular volume of the virtual environment, and one or more saliency factors can be determined based on whether and/or where the object is located in the field of view of the reference avatar. In another example, the reference avatar properties can include the location of the reference avatar in the virtual environment, which can be used to determine a distance between an object and the reference avatar to determine one or more of the saliency factors for that object.

Figure 3:
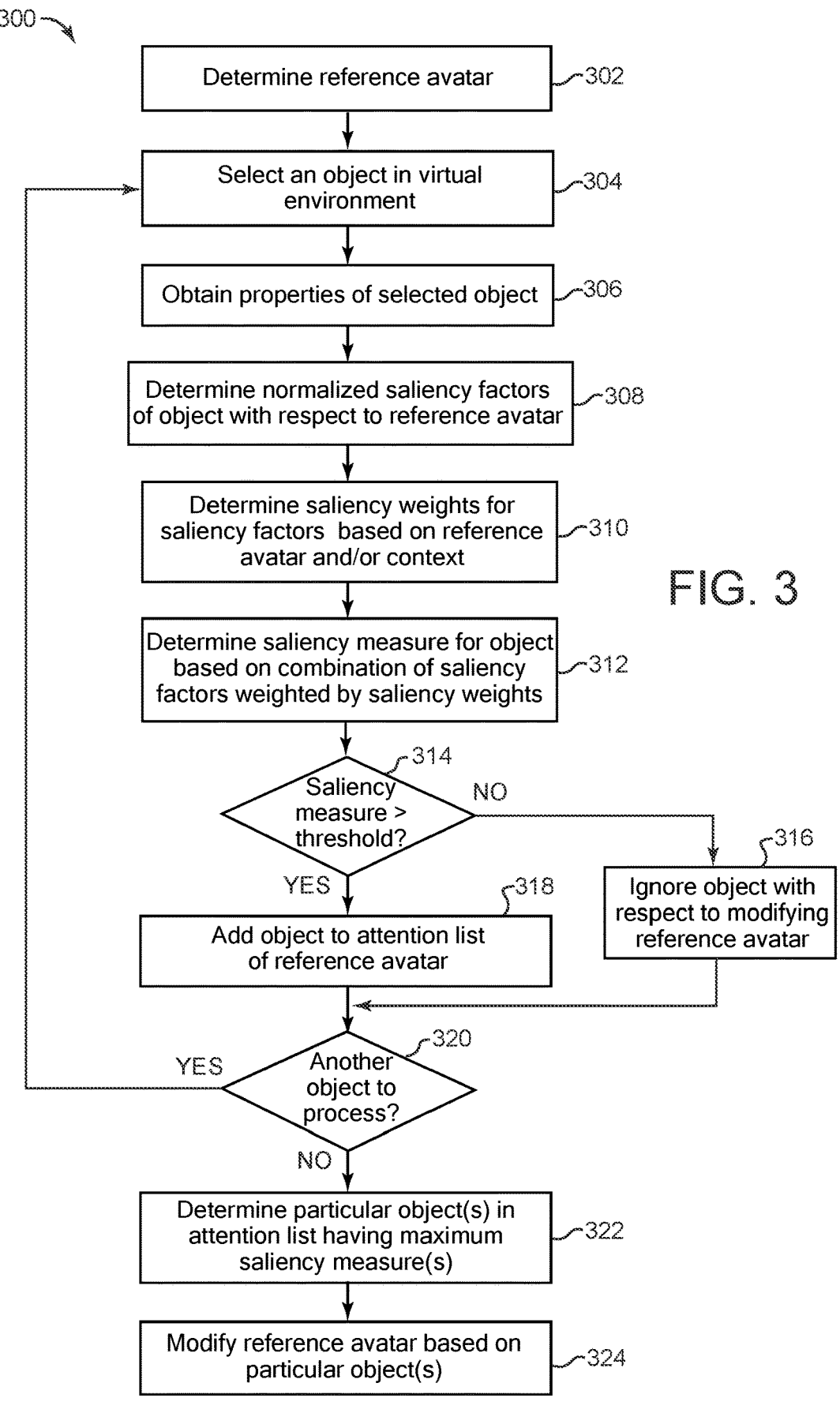
FIG. 3 is a flow diagram of an example method to automatically extract salient objects in virtual environments and modify an avatar based on an object, in accordance with some implementations.

Further examples of saliency factors are described below in example implementations for avatar attention (FIG. 3)

and detection and moderation of objects (FIG. 5). Block 206 may be followed by block 208.

In block 208, a saliency measure for each object is determined based on a respective combination of the saliency factors determined for that object. In some implementations, the saliency measure for an object can be a linear combination of the saliency factors for that object. For example, the saliency factors determined in block 206 for a particular object with respect to the reference avatar can be summed together to determine the saliency measure for that object with respect to the reference avatar, where the sum indicates the total saliency (saliency measure) of the object. A respective saliency measure is determined for each object determined in block 204. In some implementations, the saliency measure can be normalized to a particular numerical range, e.g., a range between 0 and 1 or other range in various implementations.

In some implementations, a respective saliency weight can be determined for each saliency factor (or for a subset of the saliency factors being used), and each weight is multiplied by its associated saliency factor to determine a weighted saliency factor. The saliency factors, included weighted saliency factors, are combined to determine the saliency measure. The use of weights allows individual saliency factors to be changed in the amount of their contribution to the saliency measure, e.g., based on the use or application for which object saliency is being determined. This allows users and developers to modify saliency factors easily for custom applications. Some examples of saliency weights are described below with respect to FIGS. 3 and 5. Block 208 may be followed by block 210.

In block 210, it is determined whether the respective saliency measure of each object satisfies (e.g., is greater than) a saliency threshold. For example, the saliency threshold can be associated with the reference avatar. In some examples, the saliency threshold can be determined based on the particular object, reference avatar, and/or context (e.g., virtual environment) in which the reference avatar is located. The threshold can be based on a desired influence of object saliency. For example, if only objects that are highly salient to the reference avatar are to be selected to cause further processing of the reference avatar and/or object, then the threshold can be set to a higher value (e.g., 0.5 in a range of 0 to 1). If most objects or any object in the environment of the reference avatar are to be selected to cause further processing, then the threshold can be set to a low value (e.g., 0, or 0.1 in a range of 0 to 1). For example, if the saliency threshold is zero, then objects having any non-zero saliency measure with reference to the reference avatar will be selected to cause further processing.

If the saliency measure of an object does not satisfy (e.g., is less than) the saliency threshold, then the method continues to block 212, where that object is ignored. For example, the object is not selected to cause processing of the reference avatar and/or object as described in various implementations herein. For example, the reference avatar and object are not modified based on the object, the object and saliency factors are not stored or transmitted for access by users, etc.

If the saliency measure of an object satisfies (e.g., is greater than or equal to the saliency threshold), then the method continues to block 214, in which the reference avatar and/or the object is modified in the virtual environment based on at least one property of the object, and/or the object is processed for transmission or access.

In some example implementations, the reference avatar and/or object can be modified. For example, the reference avatar can be animated within the virtual environment to appear to react to the object, signify the presence of the object in the environment, or otherwise visually indicate that the avatar appears to be "aware" of the object. The object has been determined in previous blocks of method 200 to have a sufficient importance to the reference avatar to cause the avatar to react to the object. For example, the "attention" or gaze of the reference avatar can be modified based on the location of the object in the environment, which can include rotating or otherwise moving eyes, head, and/or other body parts of the reference avatar within the virtual environment to be directed toward the object. In other examples, the avatar can be animated to move away from the object, e.g., if the object could damage or obstruct the avatar. Some examples of modifying the reference avatar based on salient objects in the environment are described below with reference to FIG. 3.

In some example implementations, the object (and/or reference avatar) is processed for transmission or access, e.g., by one or more users (including system processes). In some implementations, the object (including its properties) can be transmitted to the device(s) of one or more moderators or system processes, or can be stored in a storage device that is accessible to the one or more moderators or processes, to allow the moderators to evaluate the object and/or its data, e.g., with respect to guidelines associated with the system and provider that provides the virtual environment. In some implementations, the reference avatar and its properties can also be transmitted and/or stored for access. For example, the object may have been determined, via saliency factors described above, to include inappropriate visual and/or audio content for the virtual environment. The object may be removed or modified to remove the inappropriate content from the virtual environment. In some implementations, the object (and the reference avatar) can be captured by an avatar that acts as a detection bot providing immersive and embedded views of the virtual environment for evaluation by a system and or humans. In some implementations, the object (including its properties) are transmitted or accessed by a machine learning model that is being trained based on the object as training data, where the object has been determined to be relevant to the training of the model via the saliency measure. Some examples of modifying, storing or transmitting salient objects for such applications are described below with reference to FIG. 5.

FIG. 3 is a flow diagram illustrating an example method 300 to automatically extract salient objects in virtual environments and modify an avatar based on an object, in accordance with some implementations. In some implementations, method 300 can be an example implementation of method 200 of FIG. 2.

In some implementations, method 300 can be implemented, for example, on a server system, e.g., online metaverse platform 102 as shown in FIG. 1. In some implementations, method 300 can be performed by a metaverse engine 104 and saliency engine 107 of an online metaverse platform 102. In some implementations, some or all of the method 300 can be implemented on a system such as one or more client devices 110 and 116 as shown in FIG. 1, and/or on both a server system and one or more client systems. In described examples, the implementing system includes one or more processors or processing circuitry, and one or more storage devices such as a database, data structure, or other accessible storage. In some implementations, different components of one or more servers and/or clients can perform different blocks or other parts of the method 300. Method 300 may begin at block 302.

In block 302, a reference avatar in a virtual environment is determined for which a respective saliency measure is to be determined with respect to one or more objects in the virtual environment. The reference avatar is to be modified, e.g., moved within the virtual environment, in reaction to one or more objects and based on properties of the objects. For example, a simulated gaze of the reference avatar can be modified based on one or more objects determined to be salient to the reference avatar.

In some implementations, the reference avatar can be a character model provided in a virtual environment. For example, the reference avatar can be an object such as character model provided in a virtual environment. The reference avatar can appear as a 3D model in a 3D virtual environment, or appear as a 2D model, bitmap, or sprite in a 2D virtual environment, representing a person, animal, vehicle, etc., that includes visual textures including pixels providing a visual appearance.

One or more properties of the reference avatar can also be determined, including, for example, a particular size, a location within the virtual environment, an orientation or facing, a field of view within the virtual environment (described below), an auditory perceptual range of the reference avatar in the virtual environment, a visual shape, a body pose, visual texture(s), audio output effects (e.g., during particular avatar conditions such as walking of the reference avatar), etc., and/or other properties.

In some examples, the reference avatar represents and is controlled by a user, e.g., a user or player in a game or other user of other virtual experience, so that the user can, e.g., cause the reference avatar to move by inputting particular commands to the virtual experience, to perform actions by inputting associated commands to the virtual experience, etc. In further examples, the reference avatar may not be controlled by any human user, e.g., may be a non-player character or other object in the virtual environment that is controlled, for example, by game software or virtual experience software providing the virtual environment. Block 302 may be followed by block 304.

In block 304, an object in the virtual environment is selected. In some cases or implementations, there may be multiple objects in the virtual environment. In some implementations, the object can be any object in the virtual environment in which the reference avatar is located, e.g., in the same virtual world, virtual environment, or area of a virtual environment. In some implementations, some objects in the virtual environment can be ignored for the processing of method 300, e.g., objects designated or tagged as not relevant (e.g., to the reference avatar, or in other cases not relevant to any other object), objects that are invisible to the reference avatar (or invisible to a user controlling the reference avatar), objects that are over a threshold distance away from the reference avatar, etc.

For example, the object can be a different avatar (e.g., user-controlled or not user-controlled), scenery or environmental object (e.g., representing a tree, hill, building, cloud, vehicle, sign, road or road section, etc.), a smaller object (e.g., representing a lamp, ball, hat, phone, etc.), light effect (e.g., representing a beam of light emitted from a light source object such as a lamp in the virtual environment, or a shadow of an object), etc. In some implementations, the object can be a particular area or location in the virtual environment. In some cases, the object (e.g., a large object) can be collections of smaller objects. In some implementations, the object can be associated with an event occurring in the virtual environment; e.g., an object that appears to explode, collapse, etc., e.g., based on other objects, events, or commands from users. Block 304 may be followed by block 306.

In block 306, one or more particular properties of the selected object in the virtual environment are obtained. These are particular properties that are used in determining saliency factors as described below.

Obtained object properties can include spatial properties within the virtual environment, e.g., location (e.g., 3D or 2D coordinates indicating a location with reference to an origin position in the virtual environment), velocity and/or acceleration of the object within the virtual environment (e.g., linear and/or angular velocity). In some implementations, the properties can include size of the object. In some implementations, object properties can include the presence of one or more tags associated with the object, where each tag can include (e.g., be associated with) data or content, such as a descriptive label that includes text, image, audio, etc.

In some implementations, object properties can include content features of the object. For example, object properties can include visual properties that can be displayed via pixels of the object. For example, one or more textures of the object can be obtained, such as image textures provided on a 3D mesh or image bit maps of a 2D object, including images, videos, stickers, etc. Visual properties can include shape properties such as 3D meshes, shape maps, or models defining the object.

In some implementations, visual properties can include higher-level classifications of properties based on the textures, shapes, and other lower-level visual properties (e.g., determining recognized semantic features depicted in textures or shapes of the object). Or, such classification can be performed in the determination of saliency factors described below. Such classified visual properties can include one or more facial features of the object that represents a humanoid character, including eye color, hair style (e.g., long or short hair), beard, mustache, etc., facial accessories (e.g., glasses, sunglasses, face mask, etc.), etc. Classified visual properties can include a facial expression of the object, e.g., a smile, frown, fearful expression, neutral expression, etc., and/or a degree or magnitude of the facial expression. Classified visual properties can include body properties of objects representing humanoid characters, including size, body weight classification, clothing types (e.g., coats, shirts, blouses, shoes, hats, rings, watches, etc.), etc. Classified visual properties can include body positions, poses, and/or movements/animations of objects (such as avatars) representing humanoid characters, such as walking, running, jumping, diving, sitting, standing, crouching, etc.

In some implementations, object properties can include audio properties that include sounds emitted by an object in a virtual environment (e.g., based on digital audio data associated with the object), such as speech, sound effects, etc. In some implementations, audio properties can include higher-level classifications based on the lower level audio data, such as recognized speech (and/or recognized semantic content of the speech), classified sound effects (whistle, explosion, etc.); or such classification can be performed in the determination of saliency factors described below. In some implementations, object properties can include text content, such as text that has input by a user in a virtual environment. In some implementations, text properties can include higher-level classifications based on lower level text data, such as recognized semantic content of the text; or such classification can be performed in the determination of saliency factors described below. In some implementations, object properties can include the presence of one or more tags associated with the object, where each tag can include (e.g., be associated with) data or content, such as a descriptive label that includes text, image, audio, etc.

In some implementations, higher level classifications of content features such as visual properties, audio properties, text properties, and other properties described above can be detected and classified using machine learning models and classifier models trained to detect particular content and content types, rules-based expert systems that can detect such features, image, audio, and text recognition techniques, pattern matching algorithms, etc. For example, a machine learning model trained to detect facial expressions in images can classify a facial expression as a smile, frown, neutral expression, etc. and/or can classify a degree or magnitude of the detected facial expression.

The set of object properties obtained in block 306 may depend on the particular saliency factors being used (described below). For example, if saliency factors are being used to determine how to modify the reference avatar (e.g., shift the gaze or attention of the avatar), then a particular set of object properties is obtained which is to be used in saliency factors relating to avatar gaze as described below. In this way, a small set of object properties in a virtual environment can be detected and processed, allowing a large reduction in processing, storage, and transmission of data describing the virtual environment as compared to obtaining larger sets of raw data describing all of the objects and properties of the virtual environment. Block 306 may be followed by block 308.

In block 308, a set of multiple normalized saliency factors of the object are determined with respect to the reference avatar, based on the properties of the object determined in block 306 and/or based on one or more properties of the reference avatar. The saliency factors indicate a degree to which the object is salient, e.g., of relevance or importance, to the reference avatar, where the greater the relevance, the greater the likelihood that the reference avatar is to be automatically modified in reaction to the object (e.g., automatically moved by the virtual experience engine in the virtual environment, automatically caused to output content such as audio, text, etc. in the virtual environment, etc.).

In some implementations, each saliency factor can be expressed as a numerical saliency value within a range of values. For example, each saliency factor for an object can be normalized to be a saliency value within the same numerical range that is used for all the saliency factors of that object, and in some implementations can be the same numerical range used for saliency factors of all the objects in the virtual environment. In some examples, the numerical range can be from 0 to 1, or can be a different range in other implementations.

Saliency factors can be defined based on the type of modification that may be made to the reference avatar. For example, if gaze or attention of the avatar is to be modified to look at an object, the saliency factors are defined to be relevant to properties of objects that make the objects more likely to be noticed or interesting to look at, which would cause the avatar's gaze to shift.

Saliency factors can determined based on properties of the object obtained in block 304. Each saliency factor can be based on a different set of the one or more properties of the object determined in block 204. For example a first saliency factor can be based on a first object property, a second saliency factor can be based on a second object property, a third saliency factor can be based on the first and second object properties, etc.

In some implementations, one or more saliency factors can be determined based on a set of object properties and additionally based on one or more properties of the reference avatar. For example, the properties of the reference avatar can include the location of the reference avatar in the virtual environment, which can be used to determine a distance between the object and the reference avatar to determine of one or more of the saliency factors for the object.

The properties of the reference avatar can include a field of view of the reference avatar within the virtual environment. The field of view can include an angular range, a direction, and a maximum distance of the field of view. For example, the field of view can be defined as a 3D volume (or 2D area) that sweeps an angular range extending from a particular point of the reference avatar (e.g., a point on an eye or centered between two eyes of the avatar) centered on a particular direction. The field of view indicates the extent of the view of the reference avatar at any given moment (without moving any portion of the avatar). In some implementations, the field of view can be a conical volume extending from the avatar's eyes in the particular direction from a narrow to a wider range.

The field of view also can include a maximum depth or distance from the reference avatar in which particular properties of objects can be viewed or noticed by the reference avatar (maximum viewing distance). For example, if implementing a field of view similar to a human field of view, the angular range can be about 200-210 degrees horizontal range and 130-150 degrees vertical range about a particular view direction. Other fields of view can also be implemented. In some implementations, a reference avatar can have an angular range for field of view that includes movement of the eyes of the avatar. In some implementations, the reference avatar is controlled by a user and the user's device displays a first-person perspective that is the same as (or based on) the field of view of the reference avatar. In other implementations, the user's field of view of the virtual environment is different than the reference avatar's field of view (e.g., the user has a third-person perspective of the reference avatar, such as from above or to the side of the avatar; or the reference avatar is a non-user-controlled avatar having its own field of view).

Some saliency factors can be determined based on whether and/or where the object is located in the field of view of the reference avatar. Saliency factors that may be affected by whether the object is in the reference avatar's field of view include visual saliency factors (e.g., based on viewing particular spatial and/or visual properties of the object, such as location, orientation, velocity, visual textures, shape, color, body, etc.). Examples of saliency factors that may not be affected by whether the object is in the reference avatar's field of view include audio properties (e.g., voice or sound effects) and force properties (e.g., simulated wind from a fan or a blast of force from an explosion), which can be "sensed" by the reference avatar regardless of whether the object is in the field of view of the avatar.

Some examples of saliency factors that can be used for avatar modifications related to attention or gaze (and/or other types of avatar modifications) are described below.

A depth saliency factor can be determined based on a distance of the object from the reference avatar and based on the field of view of the reference avatar. Objects closer to the reference avatar have a greater saliency value than objects that are farther away from the reference avatar. In some implementations, this saliency factor is non-zero (e.g., has a saliency value greater than 0, indicating a minimum amount of saliency to the reference avatar) only for objects currently in the field of view of the reference avatar. In some examples, the depth saliency factor can be determined as:

$$S_d = (1 - d_n)^2$$

where $S_d$ is the normalized object depth saliency factor and $d_n$ is equal to $d/d_{max}$, where d is the distance between the reference avatar and the object and $d_{max}$ is the maximum field of view of the reference avatar. This example provides a depth saliency factor as having an exponential falloff with distance from the reference avatar, to provide realistic saliency based on distance. Other implementations can use other relationships (e.g., a linear reduction of saliency with distance).

An orientation saliency factor can be determined based on whether and the degree to which the object and the reference avatar are facing each other. For example, the orientation saliency factor can be based on an orientation or facing of the object with respect to the reference avatar. The object facing can be based on the orientation of a visual feature of the object, such as a face or front portion of the object. In some implementations, objects without a face (e.g., inanimate objects) can be assigned an orientation saliency factor of zero. In some implementations, objects that have a face (e.g., objects that represent humanoid characters, animals, or other characters, articles, or objects that have a discernible face or facing) can be assigned a saliency factor that is based on the degree of alignment between the facing directions of the reference avatar and the object. For example, the orientation saliency factor can be determined as:

$$S_o = 1 - f_t \cdot (f_p)$$

where $f_t$ is the facing direction of the object and $f_p$ is the facing direction of the reference avatar; these are 3D vectors (or 2D vectors in a 2D environment). The dot product of $f_t$ and $f_p$ provides a scalar value that measures the relative alignment of the two vectors. The saliency value is inversely related to the dot product. For example, when $f_t$ and $f_p$ are facing the same direction, dot product is closer to 1 (higher) and the saliency value is lower since the object and avatar are not looking toward each other (e.g., are located next to each other looking toward a sunset). When $f_t$ and $f_p$ are facing opposite directions, the dot product is closer to −1 (lower) and the saliency value is higher since the object and avatar are facing toward each other (the orientation saliency factor So is at a maximum saliency when they are directly facing each other). In some implementations, if the object is not within the field of view of the reference avatar, the orientation saliency factor is zero (indicating no saliency). With this prerequisite of being in the field of view, an ambiguity is eliminated where the dot product is −1 if the object and avatar are facing away from each other (e.g., standing back to back). Other forms of determinations of object orientation and/or reference avatar orientation can alternatively be used.

A speed saliency factor can be determined based on the movement speed (velocity) of the object within the virtual environment. In some implementations, a linear speed saliency factor and an angular speed saliency factor can be determined. In some examples, the linear speed saliency factor can be determined as:

$$S_v = \min\left(1, v/v_{max}\right)$$

where v is the linear velocity of the object and $v_{max}$ is a maximum linear velocity that can be designated, e.g., by a developer, for the particular type of objects (such as avatars). This relationship determines the linear speed saliency factor as the minimum of 1 or the ratio of the object velocity to the maximum velocity for the type of that object, thus preventing the saliency factor from being more than 1. Furthermore, the linear speed saliency speed factor is zero (indicating no saliency) if the object is outside the field of view of the reference avatar.

An angular speed saliency factor can be determined based on an angular velocity of the object. Similar to the linear speed saliency factor, the angular speed saliency factor can be determined as:

$$S_\omega = \min\left(1, \omega/\omega_{max}\right)$$

where ω is the angular velocity of the object and $\omega_{max}$ is a maximum angular velocity that can be designated, e.g., by a developer, for the particular type of object. This relationship determines the angular speed saliency factor as the minimum of 1 or the ratio of the object angular velocity to the maximum angular velocity for the type of that object, thus preventing the saliency factor from being more than 1. Furthermore, the angular speed saliency speed factor is zero (indicating no saliency) if the object is outside the field of view of the reference avatar.

A tag-based saliency factor can be determined based on whether a particular tag is associated with the object. In some implementations, this saliency factor is independent of the reference avatar, e.g., not based on any properties of the reference avatar (such as field of view). For example, this saliency factor can be binary such that it is 0 or 1, where 1 indicates the presence of the tag and 0 indicates otherwise. The tag can indicate any information which can characterize the object, e.g., any of various possible statuses, types, or characteristics of the object. In some examples, a tag-based saliency factor can be based on an "animal" tag, which indicates that an object having an "animal" tag will provide a saliency value of 1, or otherwise a saliency value of 0. In some implementations, multiple particular designated tags can be associated with a tag-based saliency factor, such that the presence of any of these tags causes the saliency value to be 1, or the presence of a particular number of particular tags causes the saliency value to be 1. In some implementations, the tag-based saliency factor is not binary and can have a saliency value based on how many of the multiple tags are present for the object; e.g., an object having 2 out of 4 particular tags can be determined to have a 0.5 saliency value for the tag-based saliency factor.

Further examples of tag-based saliency factors include a specific named tag such as "billboard" or "art display" that can be added to an object by a user or developer to draw more attention to the object. Such tags can be detected and provide additional saliency factors that increase the likelihood that the reference avatar's attention is directed to the object. In further examples, a tag can be used to direct attention of the reference avatar to the object which may be relevant to gameplay or to the user experience of a virtual environment. For example, a user-controlled avatar can move its head toward a tagged object (e.g., a flag, spatial location, etc.) which the avatar should move toward to achieve a goal in a game.

Content saliency factors can also be determined, including visual content saliency factors, audio saliency factors, and text saliency factors as described below. These saliency factors can be based on higher-level classified features determined from lower-level properties of the object, e.g., based on image textures of the object, mesh or other shape properties of the object, digital audio data, text data, etc. The classified features may have been determined and provided as object properties as described for block 306, or can be determined as part of the determination of the saliency factors. In some implementations, the higher level classified content features can be detected and classified using machine learning models and classifier models trained to detect particular content and content types, rules-based expert systems that can detect such features, image, audio, and text recognition techniques, pattern matching algorithms, etc.

A face saliency factor can be determined based on whether the object has one or more particular visual facial features (e.g., eye color, hair style, beard, mustache, etc.), including face accessories (e.g., glasses, sunglasses, lipstick, face mask, etc.). In some implementations, this can be a binary saliency factor that can have one of two values (e.g., 0 or 1), based on whether or not the particular facial feature is present on the object. In some implementations, the face saliency factor can have one of multiple (three or more) possible saliency values based on how many of multiple particular facial features are included on the object (e.g., the greater the number of particular features, the greater the saliency value). In some implementations, this saliency factor is also based on whether the object is in the field of view of the reference avatar, e.g., has a saliency value of 0 (indicating no saliency) if the object is outside the field of view.

A facial expression saliency factor can be determined based on whether the object has a particular visual facial expression on its face. In some implementations, this can be a binary saliency factor that can have one of two values (e.g., 0 or 1), based on whether or not the particular facial expression is present on the object. In some implementations, the face saliency factor can have one of multiple (three or more) possible saliency values based on a classified degree of the facial expression. For example, if the particular facial expression is a smile, a weak smile (close to flat mouth) can provide a lower saliency value (e.g., 0.2), while a very strong smile can provide a higher saliency value (e.g., 1). In some implementations, this saliency factor is also based on whether the object is in the field of view of the reference avatar, e.g., the factor has a saliency value of 0 (indicating no saliency) if the object is outside the field of view.

A body saliency factor can be determined based on whether the object is a humanoid-shaped object that has a particular visual body feature, including a particular size, a particular body visual appearance (e.g., clothing types such as coats, shirts, blouses, shoes, hats, rings, watches, etc., tattoos, etc.), a particular body pose (e.g., standing, sitting, lying down, arms raised up, etc.), and/or body accessories (e.g., hat, cape, earring, etc.). In some implementations, this can be a binary saliency factor that can have one of two values (e.g., 0 or 1), based on whether or not the particular body feature is present on the object. In some implementations, the body saliency factor can have one of multiple (three or more) possible saliency values based on how many of multiple body features are included on the object. In some implementations, this saliency factor is also based on whether the object is in the field of view of the reference avatar, e.g., has a saliency value of 0 (indicating no saliency) if the object is outside the field of view.

A body movement saliency factor can be determined based on whether the object has a particular type of body movement or animation, e.g., walking, running, jumping, diving, a gesture with one or more body components, etc. In some implementations, this can be a binary saliency factor that can have one of two values (e.g., 0 or 1), based on whether or not the particular body movement is present on the object. In some implementations, the body movement saliency factor can have one of multiple (three or more) possible saliency values based on the degree of movement, e.g., slow walking vs. fast walking, a high jump vs. a hop. In some implementations, this saliency factor is also based on whether the object is in the field of view of the reference avatar, e.g., has a saliency value of 0 (indicating no saliency) if the object is outside the field of view.

An audio saliency factor can be determined based on whether the object emits a particular sound (or particular type of sound) in the virtual environment, e.g., speaks a particular word or phrase, shouts (e.g., any words), emits a particular sound effect (or type of sound effect such as any song, a whistle within a particular range of frequencies, etc.), etc. In some implementations, the object is itself a sound, e.g., having a location, direction, amplitude, etc. in a 3D virtual environment and not having any visual component. In some implementations, the audio object can have a visual appearance in the virtual environment, e.g., as a speech bubble that displays text that corresponds to audio speech being emitted at the location of the speech bubble or from an object associated with the speech bubble.

In some implementations, the audio saliency factor is independent of the reference avatar, e.g., not based on any properties of the reference avatar (such as field of view or auditory perception range). In some implementations, the audio saliency factor can be based, in part, on whether the sound is within an auditory perceptual range of the reference avatar in the virtual environment, e.g., based on a distance between the object and the reference avatar in the virtual environment. For example, the audio is perceived by the reference avatar at a lower volume the further away the object is from the avatar.

In some implementations, the audio saliency factor can be a binary saliency factor that can have one of two values (e.g., 0 or 1), based on whether or not the particular sound is being emitted by the object (and in the auditory perceptual range of the reference avatar, if implemented). In some implementations, multiple particular designated sounds can be associated with the audio saliency factor, such that the presence of any of these sounds causes the saliency value to be 1, or the presence of a particular threshold number of the sounds causes the saliency value to be 1. In some implementations, the audio saliency factor can have one of multiple (three or more) possible saliency values based on, for example, magnitude or volume of the sound, and/or based on how many of multiple designated sounds are emitted by the object. For example, an object emitting 2 out of 4 particular sounds can be determined to have a 0.5 saliency value for the audio saliency factor.

A text saliency factor can be similar to the audio saliency factor, but is determined based on whether the object is associated with particular text, e.g., a particular text word or phrase. In some examples, the text saliency factor can be based on whether the text has been input by a particular user (e.g., a user who controls the object) and is output in the virtual environment.

One or more multimodal saliency factors can be determined based on different combinations of the saliency factors used in block 508. For example, a multimodal saliency factor can be based on object properties used in multiple individual saliency factors. In some examples, a multimodal saliency factor can be based on depth and velocity of the object, or based on a combination of a particular audio property and a particular visual property of the object.

Custom saliency factors can also or alternatively be defined, e.g., by users or developers of the online virtual experience platform, to be based on one or more specified properties of objects. For example, a user can define a saliency factor that is based on a particular user controlling the object, based on whether the reference avatar has viewed the object at a previous time or different environment, based on a particular set of sound effects emitted by an object in combination with a particular color of the object, etc. Block 308 may be followed by block 310.

In block 310, saliency weights are determined for the saliency factors determined in block 308 (or a subset of the saliency factors), based on the reference avatar and/or based on a context of the virtual environment. A saliency weight modifies the contribution of its associated saliency factor to a total saliency measure (described below). In some implementations, saliency weights can be determined as normalized values in a particular range, e.g., between 0 and 1. A saliency weight can be determined for each saliency factor, and each weight is multiplied by its associated saliency factor to determine a weighted saliency factor.

In some examples, one or more saliency weights can be associated with particular saliency factors for the reference avatar or for the object, e.g., specified by a creator of the reference avatar or a user who controls the reference avatar, and stored in settings associated with the reference avatar. In some examples, a user controlling the reference avatar may have specified a weight of 0.5 for saliency factors relating to visual properties of objects (e.g., face, facial expressions, body, body movement) in the field of view of the reference avatar, which indicates that the user desires that these saliency factors have less relevance in determining whether objects are salient to the reference avatar.

One or more saliency weights can be associated with the context of the virtual environment in which the object is being evaluated for saliency. In some implementations, saliency weights can be based on both the reference avatar and the context, based on the object, the reference avatar, and the context, or based on the object and the context. For example, a particular saliency weight can be associated with a particular avatar when in a particular context. In some implementations, an individual reference avatar saliency weight can be combined (e.g., summed, multiplied, etc.) with an individual context saliency weight to obtain a total saliency weight (or similarly combining an object saliency weight with one or more of the other saliency weights).

Context saliency weights can be associated with particular, delineated areas of a virtual environment, e.g., a particular virtual room, zone, etc. Context weights can also be associated with particular events or time periods, such that the context weight is applied only during the event or time period (e.g., during an explosion, a rocket launch, a designated holiday time period, etc.). Context weights can be associated with a particular context, e.g., an object that has been moved into a particular area of the virtual environment.

For example, a developer of the virtual environment (e.g., game creator) may have specified a weight of 0.2 for audio saliency factors in a particular area of the virtual environment (e.g., a noisy street) that has been designed to reduce the ability to detect any sounds emitted by objects, and a weight of 1.0 in other areas of the environment.

The use of saliency weights allows individual saliency factors to be changed in importance depending on the application for which object saliency is being determined, and allows users and developers to modify saliency factors easily for custom applications and environments.

In some implementations, one or more saliency weights can be determined automatically, e.g., by the system determining a saliency measure for the object. For example, saliency weights can be determined by a rules-based technique (e.g., look-up table referencing weights for particular environments or avatars) or a machine learning model that has been trained to provide particular saliency weights for particular types of reference avatars and/or virtual environments. Block 310 may be followed by block 312.

In block 312, a saliency measure is determined for the object, with respect to the reference avatar, based on a combination of the determined saliency factors and weighted by the determined saliency weights. In some implementations, the saliency measure for an object can be a weighted linear combination of the saliency factors for that object. For example, the saliency factors determined in block 308 for a particular object with respect to the reference avatar can each be multiplied by an associated respective saliency weight determined in block 310, and the resulting weighted saliency factors are summed together to determine the saliency measure for that object with respect to the reference avatar. The saliency measure can indicate the total saliency of the object to the reference avatar. In some implementations, the saliency measure can be normalized to a particular numerical range, e.g., a range between 0 and 1 or other range in various implementations.

For example, the saliency measure can be determined as follows, for an object o with respect to a reference avatar a, in a context c:

$$S(o, a, c) = \sum_{\forall i \in N} w_i(a, c) \cdot S_i(o, a)$$

where the saliency measure S(o,a,c) is the total saliency based on the object, reference avatar, and context, $w_i(a,c)$ is the saliency weight based on the reference avatar and context, and Sio(o,a) is the saliency factor based on the object and reference avatar. The saliency measure can be a value between 0 and 1. In some implementations, a more complex and/or nonlinear combination of saliency factors can be used to determine the saliency measure.

The saliency measure is determined based on a combination of saliency factors that each indicate a saliency of different object properties of an object, e.g., properties based on different modes and types of data (image, spatial, audio, etc.). Thus, multimodal data can be evaluated for saliency using the various saliency factors and saliency measure.

In some implementations, the saliency factors and saliency measure can be determined on the fly as a reference avatar is interacting with the virtual environment. Block 312 may be followed by block 314.

In block 314, it is determined whether the saliency measure of the object satisfies (e.g., is greater than) a saliency threshold. For example, the saliency threshold can be associated with the reference avatar, and/or in some implementations can be associated with the context or with a combination of the reference avatar and the context. In some examples, the saliency threshold can be variable, and can be determined based on the particular object, reference avatar, and/or context. For example, the threshold can be assigned a value in the numerical range of the saliency measure based on the importance of object saliency for the particular reference avatar (e.g., based on user-specified or developer-specified settings associated with the reference avatar). For example, if only objects that are highly salient to the reference avatar are to potentially modify the reference avatar, then the threshold can be set to a higher value (e.g., 0.5 in a range of 0 to 1). If most objects or any object in the environment of the reference avatar is eligible to modify the reference avatar (e.g., if the object otherwise qualifies as described above), then the threshold can be set to a lower value (e.g., 0, or 0.1 in a range of 0 to 1). For example, if the saliency threshold is zero, then objects having any non-zero saliency measure with reference to the reference avatar are eligible to cause reference avatar modification.

If the saliency measure of the object does not satisfy (e.g., is less than) the saliency threshold, then the method continues to block 316, where the object is considered not salient and is ignored with respect to the reference avatar for the avatar modification described herein. For example, the object's presence does not cause the reference avatar to be modified as described for block 322 below. Block 316 may be followed by block 320, described below.

If the saliency measure of an object satisfies (e.g., is greater than or equal to the saliency threshold), then the method continues to block 318, in which the object (e.g., an identifier for the object) is added to an attention list associated with the reference avatar and/or associated with the particular context in which the saliency measures were determined (e.g., a particular virtual environment, experience, game, conversation between avatars, etc.). The attention list can be used to list all of the objects in the virtual environment that are currently eligible to cause the reference avatar to be modified. In some implementations, other mechanisms or structures can be used to track eligible objects. Block 318 may be followed by block 320.

In block 320, it is determined whether there is another object in the virtual environment to process for saliency in method 300. For example, there may be multiple objects in the virtual environment. In some implementations, some objects in the virtual environment can be ignored for the processing of method 300, e.g., objects designated or tagged as not relevant, objects that are invisible to the reference avatar (or invisible to a user controlling the reference avatar), objects that are over a threshold distance away from the reference avatar, etc. If there is another object to process, the method continues to block 304 to select another object in the virtual environment. If there are no further objects to process, the method continues to block 322.

In block 322, one or more particular objects in the attention list are determined, the particular objects having maximum saliency measure(s) of the objects in the list. For example, the saliency measures of all the objects in the attention list can be compared, and the objects can be sorted based on the magnitudes of their saliency measures such that the objects with greater saliency measures are at the top of the attention list. The object having the greatest saliency measure (e.g., positioned at the top of the list) can be determined as the particular object.

In some implementations, the determination of the particular object(s) can be performed as follows:

$$o*(a) = \arg\max S(o, a)$$

where o*(a) is the particular object with respect to the reference avatar a, and arg max S(o,a) is the object for which the saliency measure S attains the maximum value. This determines the object which has the maximum total saliency, for the specific reference avatar in the current context (e.g., all of the objects in the list can be in the current context). In some implementations, multiple particular objects can be determined, e.g., the objects having the greatest saliency measure of the objects in the list. Block 322 may be followed by block 324.

In block 324, the reference avatar is automatically modified in the virtual environment without user input, based on the particular object(s) determined in block 322. In some implementations, the reference avatar is modified based on at least one property of the object, e.g., the location of the object in the virtual environment, a magnitude of sound emitted by the object as an audio property, etc. In some implementations, the reference avatar is modified by automatically animating (or otherwise altering) the reference avatar or one or more portions of the reference avatar based on the object and its properties, e.g., moving the avatar portions. For example, the gaze or attention of the reference avatar is modified, e.g., so that the avatar is looking at the location of the particular object. In some implementations, multiple particular objects are determined that are nearby in location such that the avatar is modified to look at a position between the multiple objects.

In some example implementations, the reference avatar can be animated within the virtual environment to appear to react to the particular object, signify the presence of the object in the environment, or otherwise visually indicate that the reference avatar is "aware" of the object. The object has been determined in previous blocks to have a sufficient saliency to the avatar to cause the avatar to react to the object.

In some examples, an animation model can be used to move the avatar (without user input, e.g., movement provided by the virtual experience/game and without a controlling user's inputs to move the avatar) based on one or more properties of the particular object determined in block 322. For example, in some implementations, a gaze shift model can be used to control a gaze direction of the reference avatar toward the particular object, based on input parameters that include one or more object properties. Gaze shifts are coordinated movements of the eyes, head, body portions, and/or body of an avatar toward objects and information in the virtual environment. Gaze shifts can serve as units of avatar behavior, which may play a role in communication with other users in the virtual environment. For example, gaze can be used to convey and manage attention in social interactions between avatars (and their users) and enable beneficial social and cognitive processes for the users.

For example, the attention or gaze of the reference avatar can be modified based on the location of the object in the environment, and can include moving the eyes of the avatar (e.g., moving pupils within eye areas), and/or rotating or otherwise moving a head of the reference avatar within the virtual environment so that the eyes of the avatar are directed toward the object, causing the avatar to appear to be looking at the object. Other modifications of the avatar can include moving additional portions of the avatar body, e.g., an upper torso (trunk), so that the avatar's head is facing the object, and/or moving (e.g., rotating) the entire reference avatar toward the object. In some implementations, multiple such modifications can be automatically performed on the reference avatar sequentially or at least partially simultaneously, e.g., moving eyes, followed by moving the head, followed by moving the torso, followed by moving the entire avatar.

In some examples, the gaze shift model can accept as input the properties of the gaze shift that is synthesized for the reference avatar. For example, the input parameters can include gaze target position (where the reference avatar will look), head and trunk alignments (how far each of these body parts will rotate relative to the particular object), head and trunk latency (delay before head and trunk start moving), and/or velocity parameters for eyes, head, and trunk to specify the velocity of movement of these avatar portions (e.g., which can be user-defined). Given these inputs, the model synthesizes a gaze shift that turns the avatar's eyes, and potentially also head and trunk, toward the particular object.

In some implementations, the animation of the gaze shift can include moving the eyes of the reference avatar (e.g., moving representations of pupils/irises within eye areas, e.g., eye sockets, of the eyes). In some implementations, eye movement can be generated using a set of known kinematic laws based on human eye movements, e.g., for peak eye velocity. For example, the movement of both eyes of the reference avatar toward the particular object can be animated such that shortest-path rotations of the eyes in their sockets are made toward the particular object, e.g., the eyes begin to rotate toward the object simultaneously, one of the eyes reaches the object first and locks onto it while the other eye continues to rotate toward the object until it has also aligned with the object.

In some implementations, when the reference avatar's gaze is moved toward the particular object that lies beyond the eyes' movement range within eye sockets, head movement can be animated during the gaze shift to enable the eyes (and field of view of the avatar) to reach the object. In some implementations providing avatar movements similar to realistic human movements during gaze shifts, the avatar gaze shift can include greater head movements than the minimum head movement required for the eyes (or field of view) to see the object, e.g., the head can continue moving until it faces the particular object (e.g., a point between the eyes faces the object). In some implementations, a head movement latency can be provided, where the head moves after a delay (e.g., up to 100 ms) from when the eyes start moving. In some implementations, the delay can be based, at least in part, on the saliency measure determined for the particular object (e.g., a greater saliency measure can cause a lower delay, a lower saliency measure can cause a greater delay). In some cases or implementations, the head can be moved before the eyes are moved. In some implementations, the velocity of the head in this head movement can also be based, at least in part, on the saliency measure of the object (e.g., a greater saliency measure can cause a faster movement of the head, a lower saliency measure can cause a slower movement of the head).

An upper body portion (e.g., trunk) of a human-based reference avatar can also or alternatively be moved to direct the gaze of the avatar toward the particular object, e.g., similarly to the head as described above. For example, the trunk can be moved more slowly than eyes or head of the avatar, and may continue to move after eye and head have reached the object, e.g., until the trunk is facing the object (along with the head). In some implementations, the trunk can be moved after a delay from when the eyes and/or head start moving. In some implementations, a full body rotation of the reference avatar toward the particular object can also or alternatively be performed, e.g., delayed after the start of the trunk, head, and/or eye movement.

In some implementations, the avatar attention model and/or gaze shift can be included as part of social interactions (e.g. conversations) in a virtual environment between user-controlled avatars. For example, the gazes of the interacting avatars can be automatically moved to look at or focus on a common object in the virtual environment which is the subject of the interaction or conversation.

In some implementations, other movements of the reference avatar can be determined and performed. For example, in some cases, the avatar can be animated to move away from the particular object, e.g., if the object could hinder or obstruct the avatar. For example, if the object is a snowball thrown at the reference avatar and the snowball is in the field of view of the avatar, the avatar can automatically be animated (without user input) to move (e.g., sidestep or duck) to avoid being impacted by the snowball.

In some implementations, the above-described saliency measures can be used to modify (without user input) other aspects besides the attention or gaze of the reference avatar. For example, the reference avatar can be automatically caused to output content such as audio, text, visual objects, etc. into the virtual environment. In another example, if a reference avatar is sitting on a chair and is within a particular distance to a table object, the avatar can be modified to automatically react to the table object, e.g., place its elbows or hands on the table. Such avatar modifications can be guided by and be contextually appropriate to environmental objects and/or events, such that an avatar can be animated based on stimuli in a virtual environment surroundings, that are extracted using saliency determination as described above.

In some cases or implementations, an animation of the reference avatar provided in reaction to the object can cause the object to also be modified. For example, if the object is a ball moving toward the avatar and causes the avatar to automatically react by hitting the ball with a bat, the ball's movement trajectory and velocity in the virtual environment can be changed.

Method 300 can be performed for each of multiple objects in the virtual environment such that method 300 is independently performed multiple times, e.g., at least partially in parallel. For example, each avatar in the virtual environment (user-controlled and non-user controlled) can be designated as a reference avatar in a respective performance of method 300 for that reference avatar, and saliency measures of the other objects in the virtual environment (including the other avatars) are determined with respect to that reference avatar.

In some implementations, method 300 can be repeatedly and/or continually performed for a virtual environment, to continuously evaluate the saliency of objects over time as the virtual environment changes. For example, method 300 can be performed periodically and/or in response to particular events (e.g., one or more objects are created in or removed from the virtual environment, movement of one or more objects in the virtual environment, a user command that causes a user-controlled avatar to interact with one or more objects, etc.). For example, in a later iteration of method 300, the saliency measure for the object is updated based on changes of the object (e.g., new location, orientation, velocity, and/or trajectory of motion in the virtual environment, new facial expression, etc.), and the gaze of the reference avatar may be maintained toward the object or may be changed, e.g., if the updated saliency measure is reduced or is lower than a saliency measure of another object in the virtual environment.

FIGS. 4A to 4D are diagrammatic illustrations of an example virtual environment 400 showing interactions between a reference avatar and various objects, and modification of the reference avatar based on object saliency measures as described above with reference to FIG. 3, in accordance with some implementations. In some implementations, virtual environment 400 can be a virtual experience, a game, a simulation, or similar virtual environment.

Figures 4A, 4B:
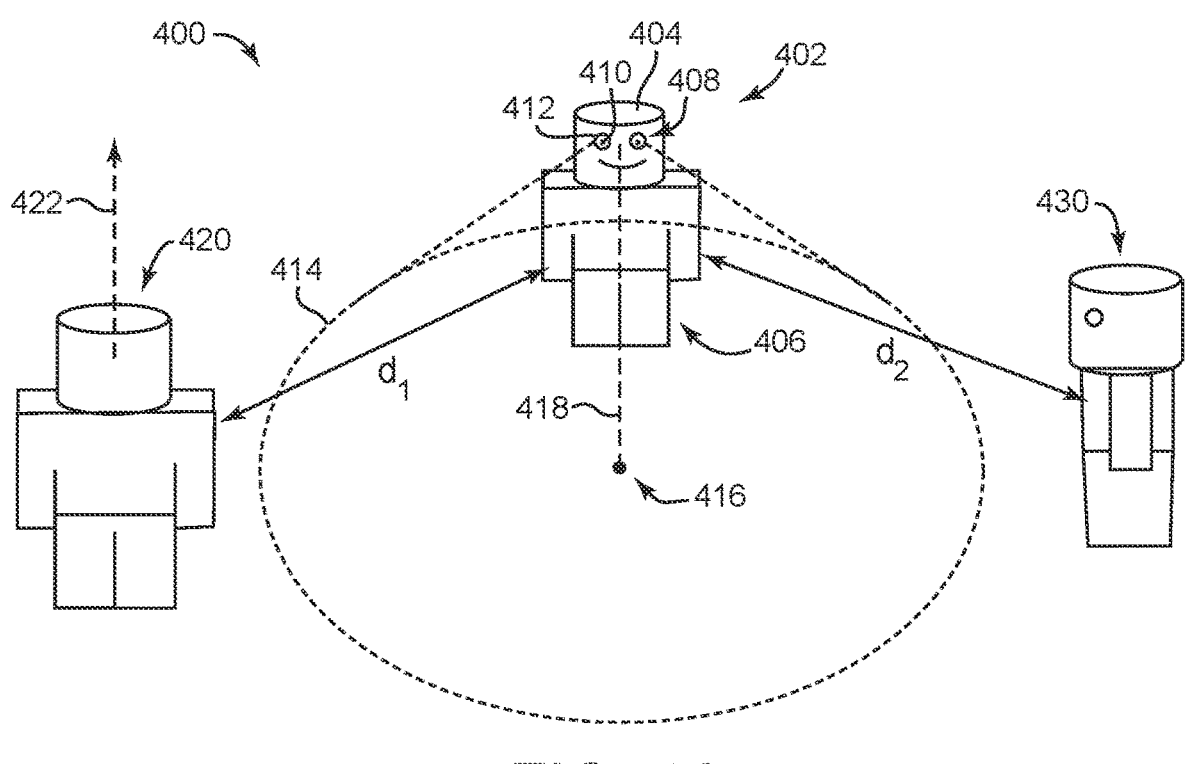
FIGS. 4A-4D are diagrammatic illustrations of an example virtual environment showing interactions between a reference avatar and various objects and modification of the reference avatar is modified based on object saliency measures, in accordance with some implementations.

In FIG. 4A, a reference avatar 402 is located in the virtual environment 400, which in this example has an approximate humanoid shape. Reference avatar 402 includes a head 404 and a body 406. Head 404 includes eyes 408 that include pupils 410 within eye sockets 412. Pupils 410 are looking directly in front of the reference avatar 402.

In this example, eyes 408 define a field of view 414 of the reference avatar, which is represented by a cone that has a narrow end at eyes 408 and widens as field of view 414 extends away from reference avatar 400 (toward the viewer in this example). Point 416 indicates a center of the field of view 414, which is approximately where the pupils 410 of reference avatar 402 are looking.

Virtual environment 400 also includes object 420 and object 430. In this example, objects 420 and 430 are other avatars. In this example, objects 420 and 430 are processed for saliency with respect to reference avatar 402 as described in method 300 of FIG. 3. The processing includes obtaining properties of objects 420 and 430 and determining normalized saliency factors.

In this example, for object 420, the determined saliency factors can include a depth saliency factor based on a distance d1 between object 420 and reference avatar 402. In this example, the depth saliency factor is zero unless the object is in the field of view of the reference avatar. Object 420 is outside field of view 414, and so the depth saliency factor is zero. An orientation saliency factor can be based on the angle between a facing vector 418 of the reference avatar and a facing vector 422 of the object 420, but since object 420 is outside the field of view 414 of the reference avatar, the depth saliency factor is zero. Velocity saliency factors are zero because object 420 is not moving in the virtual environment 400. Other saliency factors are not determined in this example. If object 420 emits audio such as speech or a shout, an audio saliency factor can be determined based on, for example, the magnitude of the sound, the distance d1 between object 420 and reference avatar 402, etc.

For object 430, the determined saliency factors are similar to those for object 420, since object 430 is also outside the field of view 414 of the reference avatar and is not moving in the virtual environment. Since the saliency factors are determined to be zero for the objects 420 and 422, the saliency measures for these objects is also zero. This is below the saliency threshold for avatar 402 and thus the objects 420 and 422 are ignored and do not cause modification of the reference avatar based on their saliency. In consequence, the eyes 408 and head 404 of avatar 402 are not moved in reaction to the presence of object 420 or 422.

In FIG. 4B, object 430 has moved (and is moving) toward the left from its previous position shown in FIG. 4A. For example, object 430 has walked toward the left at a velocity v. Method 300 is performed again to determine saliency of objects with respect to reference avatar 402. The saliency measure for object 420 is the same as for FIG. 4A since object 430 has not changed. Object 430 is now within the field of view 414 of reference avatar 402, so the depth saliency factor is based on a distance d2 between object 430 and reference avatar 402. The orientation saliency factor is based on the angle between the facing vector 418 of the reference avatar and the facing vector 432 of the object 430, which may provide an additional non-zero saliency factor in some implementations. A linear velocity saliency factor is above zero and can be determined based on the velocity v of the object 430. Other saliency factors are not determined in this example.

Figure 4C:
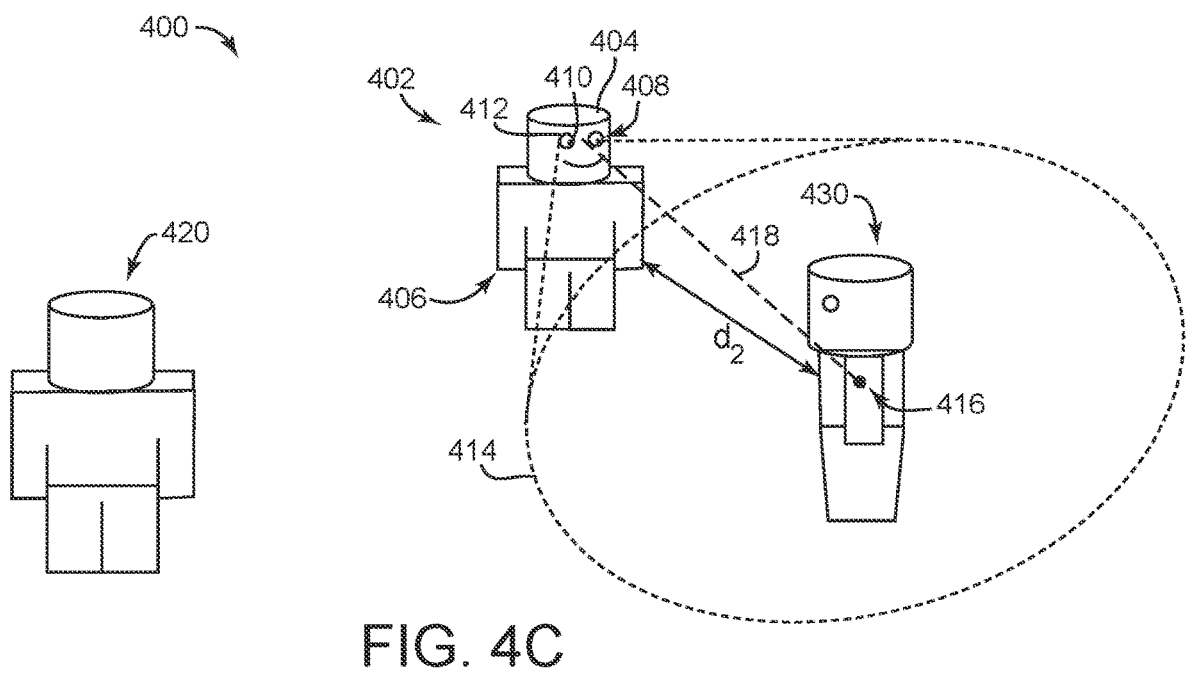

In FIG. 4C, after object 430 has moved to a new position within the field of view 414 of reference avatar 402 as in FIG. 4B and saliency factors have been determined, a saliency measure is determined for the objects 420 and 430 based on the saliency factors. Object 430 is determined to have a saliency measure over the saliency threshold and has the highest saliency measure of the two objects 420 and 430 (since it is within the field of view 414 of reference avatar 402). Accordingly, reference avatar 402 is modified.

In this example, a gaze shift is automatically provided for reference avatar 402 by the system implementing that avatar, to indicate the attention of reference avatar 402 has shifted toward object 430. In this example, pupils 410 within eye sockets 412 of avatar 402 are moved toward object 430. In addition, head 404 of avatar 402 is rotated toward object 430 such that the facing vector 418 of avatar 402 points toward object 430 (e.g., towards a central location of object 430). In some implementations, pupils 410 can be moved according to a particular velocity, and head 404 can be moved at a different velocity and/or start its movement with a delay after pupils 410 start their movement, as described above for method 300. In some implementations (not shown in this example), a trunk or upper body portion of body 406 of avatar 402 can also be rotated toward object 430, or the entire reference avatar 402 can be rotated toward object 430.

Figure 4D:
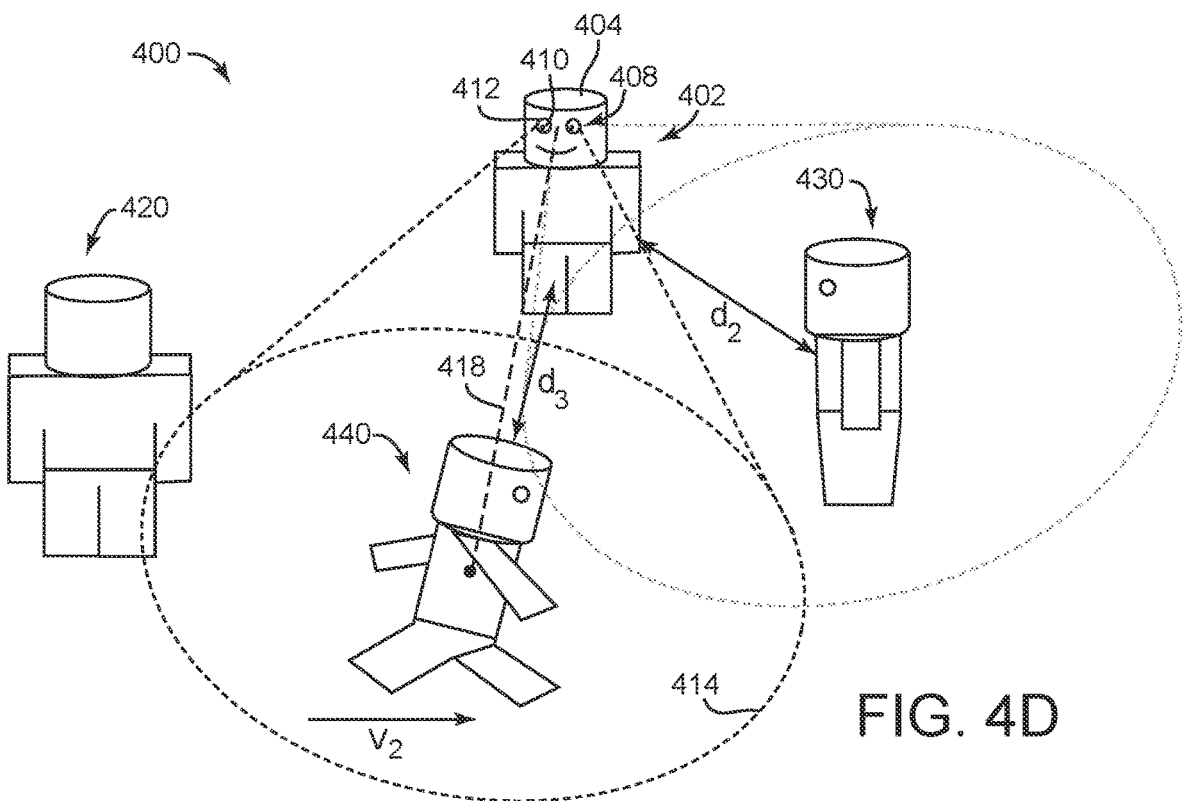

In FIG. 4D, a third object 440 (another humanoid avatar in this example) has appeared in the virtual environment 400, running from left to right in the view shown. Method 300 is performed again to determine the saliency factors and saliency measures of the objects 420, 430, and 440 with respect to reference avatar 402 (while the reference avatar is positioned as shown in FIG. 4C). The saliency measure for object 420 is determined to be the same as for FIG. 4C, and the saliency measure for object 430 is similar as for FIG. 4C except that object 430 is stationary and thus has a lower velocity saliency factor and a lower saliency measure.

Object 440 has moved into the field of view 414 of reference avatar 402 of FIG. 4C (shown in grey lines in FIG. 4D), and a depth saliency factor is determined based on a distance d3 between object 440 and reference avatar 402. The orientation saliency factor is low, based on the angle between the facing vectors of the reference avatar and the object 44. A linear velocity saliency factor is high, based on the high velocity v2 of the object 440. Other saliency factors are not determined in this example. A saliency measure is determined for the object 440 based on the saliency factors.

The saliency factors of the three objects 420, 430, and 440 are compared and object 440 is determined to have the highest saliency measure of the three objects. For example, although object 430 is closer to reference avatar 402 to provide a greater depth saliency factor than for object 440, object 440 has a high velocity saliency factor due to its high velocity compared to zero velocity of object 430, and the velocity saliency factor is weighted higher than the depth salience factor in this example.

Accordingly, reference avatar 402 is modified such that a gaze shift is automatically provided for reference avatar 402 to indicate the attention of reference avatar 402 has shifted toward object 440. In this example, pupils 410 within eye sockets 412 of avatar 402 are moved toward object 440. In addition, head 404 of avatar 402 is rotated toward object 440 such that the facing vector 418 of avatar 402 points toward object 440 (e.g., towards a central point of object 440). In some implementations, pupils 410 can be moved according to a particular velocity, and head 404 can be moved at a different velocity and/or start its movement with a delay after pupils 410 start their movement, as described above for method 300. In some implementations (not shown in this example), a trunk or upper body portion of body 406 of avatar 402 can also be rotated toward object 440, or the entire reference avatar 402 can be rotated toward object 440.

FIG. 5 is a flow diagram illustrating an example method 500 to automatically extract salient objects in virtual environments to detect, modify, and/or store the objects, in accordance with some implementations. In some implementations, method 500 can be an example implementation of method 200 of FIG. 2. Method 500 can be used, for example, to extract and store or transmit salient objects and object properties from a virtual environment for further processing, which can include object modification, object evaluation by automated systems or humans, etc. In some implementations, blocks and features of method 500 can be implemented similarly to corresponding blocks of method 300 unless otherwise indicated.

In some examples, method 500 can be implemented on a server system, e.g., online metaverse platform 102 as shown in FIG. 1. In some implementations, method 500 can be performed by a metaverse engine 104 and saliency engine 107 of an online metaverse platform 102. In some implementations, some or all of the method 500 can be implemented on a system such as one or more client devices 110 and 116 as shown in FIG. 1, and/or on both a server system and one or more client systems. In described examples, the implementing system includes one or more processors or processing circuitry, and one or more storage devices such as a database, data structure, or other accessible storage. In some implementations, different components of one or more servers and/or clients can perform different blocks or other parts of the method 500. Method 500 may begin at block 502.

In block 502, a reference avatar in a virtual environment is determined for which a respective saliency measure is to be determined with respect to one or more objects in the virtual environment. The reference avatar can act as a viewpoint source for the objects in the virtual environment, e.g., to determine saliency of objects and whether to modify or store the objects for access.

Similarly as described above for FIGS. 2 and 3, in some implementations, the reference avatar can be a model provided in a virtual environment, e.g., a 3D model in a 3D virtual environment, or as a 2D character in a 2D virtual environment. In some implementations, the reference avatar has a location in the virtual environment but is not represented by a character model or other object and does not appear in the virtual environment, or may be invisible in the virtual environment. For example, the reference avatar can act as an invisible camera located in the virtual environment, such that a user controlling the avatar may view a virtual environment from a particular location of the reference avatar. One or more properties of the reference avatar can also be determined, including, for example, a particular size, a location within the virtual environment, an orientation or facing, a field of view within the virtual environment, an auditory perceptual range in the virtual environment, and/or other properties.

In some examples, the reference avatar represents and is controlled by a user, e.g., a user or player in a game or other user of a virtual experience, so that the user can, e.g., cause the reference avatar to move by inputting particular commands to the virtual experience, to perform actions by inputting associated commands to the virtual experience, etc. In further examples, the reference avatar may not be controlled by any human user, e.g., a non-player character or other object in the virtual environment that is controlled, for example, by game software or virtual experience software providing the virtual environment. In further examples, the reference avatar can be a user-controlled or non-user-controlled bot that may or may not be visible in the virtual environment and which performs one or more functions within the virtual environment, such as observing particular salient objects in particular areas of the virtual environment. Block 502 may be followed by block 504.

In block 504, an object in the virtual environment is selected. This block can be implemented similarly as in block 304 of FIG. 3. The object can be any of the types or variations described in the methods above. In further examples, the object can be or include a user content object, such as an audio object (e.g., based on digital audio data or data file that includes sounds such as speech, sound effects, etc.) that are emitted in a virtual environment from an avatar or other object. In some implementations, the object can include a text content object, such as text input by a user into a virtual environment (e.g., displayed next to an avatar of that user, or displayed in a separate text window appearing in the virtual environment or in a separate displayed window in a graphical interface that also displays the virtual environment). Block 504 may be followed by block 506.

In block 506, one or more particular properties of the selected object in the virtual environment are obtained. These are particular properties that are used in determining saliency factors as described below. Obtained object properties can include any of the object properties described above with reference to FIGS. 2 and 3, and can be obtained using similar techniques.

In some implementations, object properties can include higher-level classifications of whether the object includes (e.g., is associated with) inappropriate or prohibited user-generated data (e.g., inappropriate content prohibited by a provider of the virtual environment), or a degree of inappropriate data included in the object. In some implementations, such classification can alternatively be determined as part of the determination of saliency factors, described below.

For example, in some implementations, determined object properties can include a binary classification of one or more properties (e.g., user-generated content) of the object as appropriate or inappropriate, or can include a degree of inappropriateness of the properties (e.g., obscenities, sensitive words or phrases, particular topics, etc.). For example, audio, text, and/or visual properties of an object can be classified using heuristics and/or machine learning models that can detect particular inappropriate content in the lower level data such as image textures, digital audio data, text data, etc.

The set of object properties obtained in block 506 may depend on the particular saliency factors used (described below). For example, if saliency factors are being used to detect inappropriate content in objects to allow modification of the objects, then a particular set of object properties are obtained which are to be used in particular saliency factors relating to such detection. In this way, a small set of object properties in a virtual environment can be detected and processed, allowing a large reduction in processing, storage, and transmission of data describing the virtual environment as compared to obtaining a larger sets of raw data describing all of the objects and properties of the virtual environment. Block 506 may be followed by block 508.

In block 508, a set of multiple normalized saliency factors of the object are determined with respect to the reference avatar, based on the properties of the object determined in block 506 and/or based on one or more properties of the reference avatar. The saliency factors indicate a degree to which the object is salient, e.g., of relevance or importance, to the reference avatar, where the greater the relevance, the greater the likelihood that the object is to be automatically modified or otherwise processed as described below. In some implementations, each saliency factor can be expressed as a numerical saliency value within a range of values, similarly as described above in method 300.

Saliency factors can be defined based on the type of modification or processing that may be made to the object. For example, if inappropriate content of the object is to be detected, the saliency factors are defined to be relevant to properties of objects that make the objects more likely to be identified to have inappropriate content, which would cause the object to be modified or stored for transmission as described below.

Saliency factors can be determined based on properties of the object obtained in block 504. Each saliency factor can be based on a different set of the one or more properties of the object determined in block 504, similarly as described in method 300. In some implementations, one or more saliency factors can be determined based on a set of object properties and additionally based on one or more properties of the reference avatar.

The properties of the reference avatar can include the location of the reference avatar in the virtual environment, which can be used to determine a distance between the object and the reference avatar to determine of one or more of the saliency factors for the object. The properties of the reference avatar can include a field of view of the reference avatar within the virtual environment. For example, the field of view can be implemented similarly as described above in method 300. Some saliency factors can be determined based on whether and/or where the object is located in the field of view of the reference avatar. Saliency factors that may be affected by whether the object is in the reference avatar's field of view include visual saliency factors (e.g., based on viewing particular spatial or visual properties of the object such as image texture of the object, shape, color, body, velocity, etc.). Examples of saliency factors that may not be affected by whether the object is in the reference avatar's field of view include audio properties (e.g., voice or sound effects) and force properties as described in method 300.

Some examples of saliency factors that can be used for object detection and/or modification are described below.

Visual saliency factors can be determined based on whether (and/or to what degree) the object has particular visual features. For example, a texture saliency factor can be determined based on whether the object has a particular texture (e.g., image layered on a 3D mesh or other skeleton of the object, or 2D bitmap on a 2D object) that portrays a particular (or particular type of) image, emoji, sticker, message, etc. Textures can be 2D or 3D. In some implementations, a saliency factor can be determined based on 2D and/or 3D textures, e.g., in a multi-view manner based on multiple views or camera angles of the object, not just the viewpoint of the object from the reference avatar. For example, image detection techniques or machine learning models can be used to detect whether inappropriate content is included in texture(s) of the object.

In implementations in which inappropriate content of objects is to be detected (e.g., content that is prohibited from display by the provider of the virtual environment), the visual textures detected as object properties in block 506 can be classified by the system implementing method 500 (e.g., using machine learning models and/or other techniques) into appropriate and inappropriate categories. For example, visual textures that portray inappropriate shapes, text, symbols, or images can be classified as inappropriate. In some implementations, a degree or magnitude of inappropriate classification can also be determined by the system, e.g., based on a confidence of detection of inappropriateness and/or based on how closely the texture maps to referenced inappropriate textures and images.

In some implementations, a visual texture saliency factor can be a binary saliency factor that can have one of two values (e.g., 0 or 1), based on whether the object includes one or more inappropriate textures, or does not include any such textures. In some implementations or cases, a visual texture saliency factor can have one of multiple (three or more) possible saliency values based on a classified degree of inappropriateness of the visual texture(s) of the object, e.g., based on the size of the inappropriate portion of the texture, based on how closely the texture maps to referenced inappropriate textures and images, and/or based on the number of occurrences of inappropriate content on the object, etc. For example, a single inappropriate symbol can be determined as a saliency value of 0.5, and three such symbols can be determined as a saliency value of 1.

A geometry saliency factor can be determined based on whether the object has a particular geometry that maps to a particular shape. For example, image detection techniques or machine learning models can be used to detect and classify a shape of the object. In some implementations in which inappropriate content of objects is to be detected, a shape detected as object properties in block 506 can be classified by the system implementing method 500 (e.g., using machine learning models and/or other techniques) into appropriate or inappropriate categories. In some implementations, a degree or magnitude of inappropriate classification can also be determined by the system. In some implementations, a geometry saliency factor can be a binary saliency factor that can have one of two values (e.g., 0 or 1), based on whether the object has an inappropriate shape or not. In some implementations or cases, a geometry saliency factor can have one of multiple (three or more) possible saliency values based on a classified degree of inappropriateness of the shape of the object, e.g., based on a confidence of detection of inappropriateness and/or based on the degree of how closely the shape maps to referenced inappropriate shapes.

A body saliency factor can be determined based on whether the object is a humanoid-shaped object that has particular visual body property (or properties), including a particular size, a particular body visual appearance (e.g., shape, tattoo, etc.), a particular body pose (e.g., standing, sitting, lying down, arms raised up, etc.), and/or body accessories (e.g., clothing, hat, cape, earring, etc.). In some implementations in which inappropriate content of objects is to be detected, each body property detected as object properties in block 506 can be classified by the system implementing method 500 (e.g., using machine learning models and/or other techniques) into appropriate or inappropriate categories. In some implementations, a degree or magnitude of inappropriate classification can also be determined by the system. In some implementations, a body saliency factor can be a binary saliency factor that can have one of two values (e.g., 0 or 1), based on whether or not the particular body property is present on the object. In some implementations or cases, a body saliency factor can have one of multiple (three or more) possible saliency values based on a classified degree of inappropriateness of the body property of the object, e.g., based on a confidence of detection of inappropriateness, based on the degree of how closely the body property maps to referenced inappropriate body properties, and/or based on how many of multiple body properties are included on the object.

A object movement saliency factor can be determined based on whether the object has a particular type of movement, e.g., walking, running, jumping, diving, a gesture with one or more body components, etc. In some implementations in which inappropriate content of objects is to be detected, each motion detected as object properties in block 506 can be classified by the system implementing method 500 (e.g., using machine learning models and/or other techniques) into appropriate or inappropriate categories. For example, particular body gestures may be considered inappropriate. In some implementations, a degree or magnitude of inappropriate classification can also be determined by the system. In some implementations, an object movement saliency factor can be a binary saliency factor or can have one of multiple (three or more) possible saliency values similarly as described for the body saliency factor.

In some implementations, any of the above saliency factors for texture, shape, body, and/or object movement can also be based on whether the object is in the field of view of the reference avatar. For example, the saliency factor can have a saliency value of 0 (indicating no saliency) if the object is outside the field of view. In some implementations, the field of view of the reference avatar is not used in the saliency factor determination.

A tag-based saliency factor can be determined based on whether a particular tag is associated with the object. In some implementations, this saliency factor is independent of the reference avatar, e.g., not based on any properties of the reference avatar (such as field of view). The tag-based saliency factor can be implemented similarly as described above in method 300.

In some implementations, a face saliency factor can be determined based on whether the object has particular visual facial features (including face accessories such as sunglasses, lipstick, etc.), e.g., similarly as described above for method 300. A facial expression saliency factor can be determined based on whether the object has a particular visual facial expression on its face, e.g., similarly as described above for method 300.

An audio saliency factor can be determined based on whether the object emits a particular sound, e.g., based on associated digital audio data. For example, the particular sound can be any of the sounds described above in method 300. In some implementations, the audio saliency factor is independent of the reference avatar, e.g., not based on any properties of the reference avatar (such as field of view). In some implementations, the audio saliency factor can be based, in part, on whether the sound is within an auditory perceptual range of the reference avatar in the virtual environment, e.g., based on a distance between the object and the reference avatar in the virtual environment.

In some implementations in which inappropriate content of objects is to be detected, each sound detected as an object property in block 506 can be classified by the system implementing method 500 (e.g., using digital signal processing filters, machine learning models, and/or other devices or techniques) into appropriate or inappropriate categories. In some implementations, a degree or magnitude of inappropriate classification can also be determined by the system. For example, the content of audio speech in the sound can be classified as inappropriate, and/or the speech can be converted to text (e.g., using a speech-to-text converter) and the text classified as inappropriate. In some implementations or metaverse platforms, particular sound effects may be considered inappropriate, such as sound effects over a threshold amplitude or disturbing sound effects (e.g., explosions, human cries, etc.).

In some implementations, the audio saliency factor can be a binary saliency factor that can have one of two values (e.g., 0 or 1), based on whether or not an associated particular sound is being emitted by the object (and in the auditory perceptual range of the reference avatar, if implemented). In some implementations, multiple particular designated sounds can be associated with the audio saliency factor, such that the presence of any of these sounds causes the saliency value to be 1, or the presence of a particular number of the sounds causes the saliency value to be 1. In some implementations, the audio saliency factor can have one of multiple (three or more) possible saliency values based on, for example, magnitude or volume of the sound, and/or based on how many of multiple particular sounds are emitted by the object. The audio saliency factor can have a saliency value based on a classified degree of inappropriateness of the sound, e.g., based on a confidence of detection of inappropriateness or based on the degree of how closely the sound maps to referenced inappropriate sounds.

A text saliency factor can be similar to the audio saliency factor, but is determined based on whether the object is associated with particular text, e.g., a particular text word or phrase. In some examples, the text saliency factor can be based on whether the text has been input by a particular user (e.g., a user who controls the object) and is output in the virtual environment. In some implementations in which inappropriate content of objects is to be detected, text detected as an object property in block 506 can be classified by the system implementing method 500 into appropriate or inappropriate categories, similarly as described above.

A crowd saliency factor can be determined based on whether the object is within a dense crowd of objects in the virtual environment. In some implementations, the crowd saliency factor can be determined based on whether the object is within a dense crowd of objects that are user-controlled avatars. In some implementations in which inappropriate content of objects is to be detected, a presence of a crowd of user-controlled avatars near the object may indicate a greater degree of importance for inappropriate content of the object (if present), because such inappropriate content would be viewed by a large number of users of the platform. In some implementations, the crowd saliency factor can be determined based on the number of user-controlled avatars within a threshold distance of the object. For example, the crowd saliency factor can be binary based on whether a threshold number of user-controlled avatars are present or not, or can have any of multiple (e.g., three or more) possible saliency values (e.g., the larger the number of user-controlled avatars, the greater the saliency value). In some implementations, the crowd saliency factor can be determined based on the number of user-controlled avatars that are within a particular area or volume of the virtual environment that has a threshold size, and the particular area or volume is within a threshold distance of the object.

In some implementations, a depth saliency factor, orientation saliency factor, speed saliency factors, etc. can be implemented similarly as described in method 300.

One or more multimodal saliency factors can be determined based on different combinations of the saliency factors used in block 508. For example, a multimodal saliency factor can be based on object properties used in multiple individual saliency factors. In some examples, a multimodal saliency factor can be based on a combination of a particular audio property and a particular visual property of the object.

Custom saliency factors can also or alternatively be defined, e.g., by users or developers of the online virtual experience platform, to be based on one or more specified properties of objects, similarly as described above in method 300. Block 508 may be followed by block 510.

In block 510, saliency weights are determined for the saliency factors determined in block 508 (or a subset of the saliency factors), based on the reference avatar and/or based on a context of the virtual environment. A saliency weight modifies the contribution of its associated saliency factor to a total saliency measure (described below). In some implementations, saliency weights can be determined as normalized values in a particular range, e.g., between 0 and 1. A saliency weight can be determined for each saliency factor, and each weight is multiplied by its associated saliency factor to determine a weighted saliency factor.

One or more weights can be associated with particular saliency factors for the reference avatar, and one or more weights can be associated with the context of the virtual environment in which the object is being evaluated for saliency, similarly as described in method 300. In some implementations, one or more saliency weights can be determined automatically, e.g., by the system determining a saliency measure for the object, similarly as described in method 300. The use of saliency weights allows individual saliency factors to be changed in importance depending on the application for which object saliency is being determined, and allows users and developers to modify saliency factors easily for custom applications and environments. Block 510 may be followed by block 512.

In block 512, a saliency measure is determined for the object, with respect to the reference avatar, based on a combination of the determined saliency factors and weighted by the determined saliency weights. In some implementations, the saliency measure for an object can be a weighted linear combination of the saliency factors for that object. The saliency measure can be determined similarly as described above in method 300. Block 512 may be followed by block 514.

In block 514, it is determined whether the saliency measure of the object satisfies (e.g., is greater than) a saliency threshold, similarly to block 314 of method 300. For example, the saliency threshold can be associated with the reference avatar, and/or in some implementations can be associated with the context or with a combination of the reference avatar and the context. In some examples, the saliency threshold can be variable, and can be determined based on the particular object, reference avatar, and/or context. For example, if the saliency threshold is zero, then objects having any non-zero saliency or relevance to the reference avatar are eligible.

If the saliency measure of the object does not satisfy (e.g., is less than) the saliency threshold, then the method continues to block 516, where the object is considered not salient and is ignored with respect to the processing described below. For example, the object's presence does not cause the object to be modified or processed as in block 518 described below. Block 516 may be followed by block 520, described below.

If the saliency measure of an object satisfies (e.g., is greater than or equal to the saliency threshold), then the method continues to block 518, in which the object is modified, stored, and/or transmitted.

For example, in some implementations, an object is automatically modified (without user input) if inappropriate content has been detected via the saliency measure described above. In some implementations, the object is modified to remove the inappropriate content, e.g., inappropriate visual texture(s), audio data, avatar animation, etc. is removed from the object so that the object no longer includes the inappropriate content. In some implementations, the object is modified to change the inappropriate content to appropriate content. For example, inappropriate words can be removed from audio content, an inappropriate gesture can be removed from an avatar animation, etc. In some implementations, the object is itself removed from the virtual environment, e.g., if the inappropriate content is not isolatable or removable from the object.

In some implementations, the object can be stored and/or transmitted, e.g., for access by devices of one or more humans or by system processes or devices (e.g., content evaluation programs that use heuristics and/or machine learning models to detect particular content in the object; machine learning model using the object for training data; etc.). For example, data of the object can be stored and/or transmitted, which can include one or more of the properties of the object, e.g., including properties used in determining the saliency factors of the object as described above. In some implementations, determined saliency factors can also be object data that is stored and/or transmitted. In some implementations, definitions and/or descriptions of the object can also be stored and/or transmitted, e.g., a 3D mesh, images from textures used on the object, etc.

In some examples, the object data can be stored for transmission to or access by user devices of human moderators who can review the object and its properties for inappropriate content. In some implementations, the object data can be transmitted, e.g., over one or more networks, to client devices of human moderators. For example, the human moderators can use the object data in creating abuse reports. In some implementations, automated systems can perform the moderation and/or deletion of inappropriate content based on salient object data provided by method 500. In some implementations, abuse reports can be generated automatically by such automated systems based on the salient object data and without requiring user input.

This storage and transmission for evaluation and moderation allows monitoring of user content in the virtual environment based on relevant objects in the environment. Determination of salient objects in method 500 enables only the relevant objects to be transmitted and stored. This reduces the transmission bandwidth required to send environment data to moderator devices, and reduces storage and processing required to store and process the environment data (e.g., render and otherwise process environment data for presentation to a moderator via a client device). This allows significant reduction in storage, processing, and transmission bandwidth needed for data used in evaluation and moderation, in which only salient object data is transmitted for moderation instead of much larger amounts of raw data describing the virtual environment that must be evaluated or processed to find inappropriate content.

Furthermore, the stored and transmitted objects are determined to be salient to the reference avatar, which allows moderation of animation of objects and virtual environments that is view dependent, e.g., based on the view from the reference avatar participating in the virtual environment. Determination of inappropriate content may depend on the viewpoint from which the content is perceived in a virtual environment.

User-generated salient objects stored in block 518 (including the reference avatar) can be anonymized and stored as data that is not indicative or associated with the user(s) that created the objects (nor the user's client device), thus providing privacy to users. In some implementations, references to user identity or user's client device address or identity, etc. are removed from the object data prior to transmission. Furthermore, object data is stored and transmitted without storing most of the data and content created by the user in the virtual environment. This allows greater privacy of user content, since some or most of user-generated content data is not stored, transmitted to servers, and/or subject to eavesdropping or hacking by malicious actors.

In some implementations, the object can be stored and/or transmitted as part of telemetry data obtained by the reference avatar that is a detection bot. In some implementations, the detection bot can be an independent, non-user controlled avatar that roams the virtual environment and captures views and experiences that a user-controlled avatar would experience in the environment. For example, the object stored and transmitted in block 518 can be with reference to a detection bot that is the reference avatar, where the object is provided as part of telemetry data provided via the bot. The bot can identify salient objects and/or record salient events occurring in the virtual environment for later playback (e.g. store object animations and/or video frames showing action of an event that occurred) using the saliency measures of method 500. The captured object and event data can be provided to human evaluators who can evaluate the virtual environment as experienced by a user avatar, to be used for evaluation, moderation of inappropriate content, debugging, troubleshooting, etc. for the environment.

In some examples, an active user or environment can be designated for telemetry data collection on the metaverse platform, e.g., as part of block 502. The designating can be performed by a user, human moderator, or a bot or other system process. Within the virtual environment, salient areas of interest in the virtual environment can be identified by the detection bot (e.g., locations as salient objects), and the areas of interest can be explored by the detection bot to maximize view coverage and collect salient telemetry data.

In some implementations, an attention or gaze model can be used for the detection bot as described in method 300 of FIG. 3, to detect a salient location (as a salient object) in a virtual environment, e.g., based on spatial properties, visual properties, audio properties, etc. of the salient location, and direct the field of view of the detection bot toward the salient location. Then, method 500 can be used to detect salient objects in the salient location in the field of view, and the salient objects can be stored and transmitted as telemetry data in block 518. In some of these implementations using the attention model for the detection bot, the reference avatar is not modified (e.g., a head, eyes, and/or other portion of the avatar are not moved toward a salient object). The attention model can identify, for example, locations in the virtual environment that maximize saliency and which are used as goals for the bot to navigate and explore. For example, the bot can automatically move toward locations that are determined to have maximum saliency.

Obtained telemetry data from the bot, including salient objects, can be analyzed automatically by the system (e.g., via rules-based systems and/or machine learning models) or by human moderators. Based on the telemetry data, the detection bot can continue its exploration of the location, e.g., if salient objects were detected. Detection bots can also automatically create abuse reports based on detected inappropriate content in a virtual environment, without user input. In some implementations, a human moderator can assume the role of a detection bot, e.g., enter the virtual environment when inappropriate content or actions have been detected, and can take actionable decisions based on being in the environment as actions occur.

In some implementations, captured object data with reference to the detection bot includes only salient objects of the environment that have been determined to be of relevance to the evaluators, as defined by the particular object properties and saliency factors that are determined in blocks 506 and 508. Thus, much less data is stored and transmitted to evaluators than if all data experienced by the bot were being captured, stored and transmitted, thus reducing the transmission bandwidth required to send object data to the observer devices, as well as reducing storage and processing required to store and process the object data (e.g., render and otherwise process the object data for presentation to the observer). This allows monitoring of the virtual environment (e.g., by human observers or automated processes) based on particular relevant objects in the environment, e.g., in real time.

In some implementations, the object can be can be stored and/or transmitted as training data for training a machine learning model that can detect and/or generate types of objects and content included in the object. In some examples, the object has been determined for saliency based on saliency factors that are relevant to training for a machine learning model such as a neural network. For example, a machine learning model being trained for detecting particular visual properties can receive an object detected by method 500 which has been determined to include those properties as indicated in saliency factors based on those properties. A machine learning model that is trained on multimodal features, e.g., features that include visual data and audio data, can be trained with objects detected by method 500 that have saliency features and/or saliency measures that are based on combinations of such visual data and audio data.

Thus, much less data is stored and transmitted to the machine learning model compared to transmitting all raw data describing the virtual environment to the machine learning model. Objects and properties are provided to the model that have been determined to be relevant to the task(s) for which the model is being trained, thus reducing training processing. Processing of raw data to obtain relevant training data is reduced or avoided, since the provided object data is previously determined to be salient to the training of the machine learning model. Thus, the machine learning model can be more lightweight than if raw data is used for training. Furthermore, just the relevant features need be transmitted and/or stored for training purposes, thus reducing the storage and transmission bandwidth required to provide training data. Block 518 may be followed by block 520.

In block 520, it is determined whether there is another object in the virtual environment to process for saliency in method 500. For example, there may be multiple objects in the virtual environment. In various implementations, some objects in the virtual environment can be ignored for the processing of method 500, e.g., objects designated or tagged as not relevant, objects that are invisible to the reference avatar (or invisible to a user controlling the reference avatar), objects that are over a threshold distance away from the reference avatar, etc. If there is another object to process, the method continues to block 504 to select another object in the virtual environment. If there are no further objects to process, the method continues to block 522.

In block 522, object selection and evaluation can be restarted, and the method continues to block 504 to select another reference avatar and/or another virtual environment. For example, block 522 can include waiting for a period of time or waiting for one or more particular event to occur that cause the return to block 502.

In some implementations, saliency measures can be determined for multiple objects in the virtual environment with reference to the reference avatar, and only the particular object(s) having the greatest saliency measure can be processed by block 518, similar to blocks 318, 322, and 323 of FIG. 3.

In some implementations, method 500 can be repeatedly and/or continually performed for a virtual environment, to continuously evaluate the saliency of objects over time as the virtual environment changes. For example, method 500 can be performed periodically and/or in response to particular events (e.g., one or more objects are created in or removed from the virtual environment, movement of one or more objects in the virtual environment, a user command that causes a user-controlled avatar to interact with one or more objects, etc.).

Method 500 can be performed for each of multiple objects in the virtual environment such that method 500 is independently performed multiple times, e.g., at least partially in parallel. For example, each avatar in the virtual environment (user-controlled and non-user controlled) can be designated as a reference avatar in a respective performance of method 500 for that reference avatar, where saliency measures of the other objects in the virtual environment are determined with respect to that reference avatar.

In some implementations of method 300 and/or method 500, particular saliency factors can be defined and/or used or not used based on the particular context and conditions of a virtual environment in which the reference avatar is currently located. For example, if there are a threshold number of user-controlled avatars present in the virtual environment, then saliency factors related to visual features of objects can be used (e.g., faces, facial expressions, bodies and body movements, etc.). Furthermore, saliency factors related to inappropriate content provided by user-controlled avatars can be used.

In various implementations, various blocks of methods 200, 300, and/or 500 may be combined, split into multiple blocks, performed in parallel, or performed asynchronously. In some implementations, one or more blocks of these methods may not be performed or may be performed in a different order than shown in these figures. Methods 200, 300, and/or 500, or portions thereof, may be repeated any number of times using additional inputs.

Various implementations as described herein are implemented with specific user permission for use of user data, e.g., user-created content, avatars and commands for avatars, etc. The user is provided with a user interface that includes information about how the user's information is collected, stored, and analyzed, and enables the user to control such use of the user's information. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

Various implementations described herein may include obtaining data in a virtual environment, and processing and storing such data. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., user device only; client+server device; etc.) and where the data analysis is performed (e.g., user device only; client+server device; etc.). Data are utilized for the specific purposes as described herein. No data is shared with third parties without express user permission.

Figure 6:
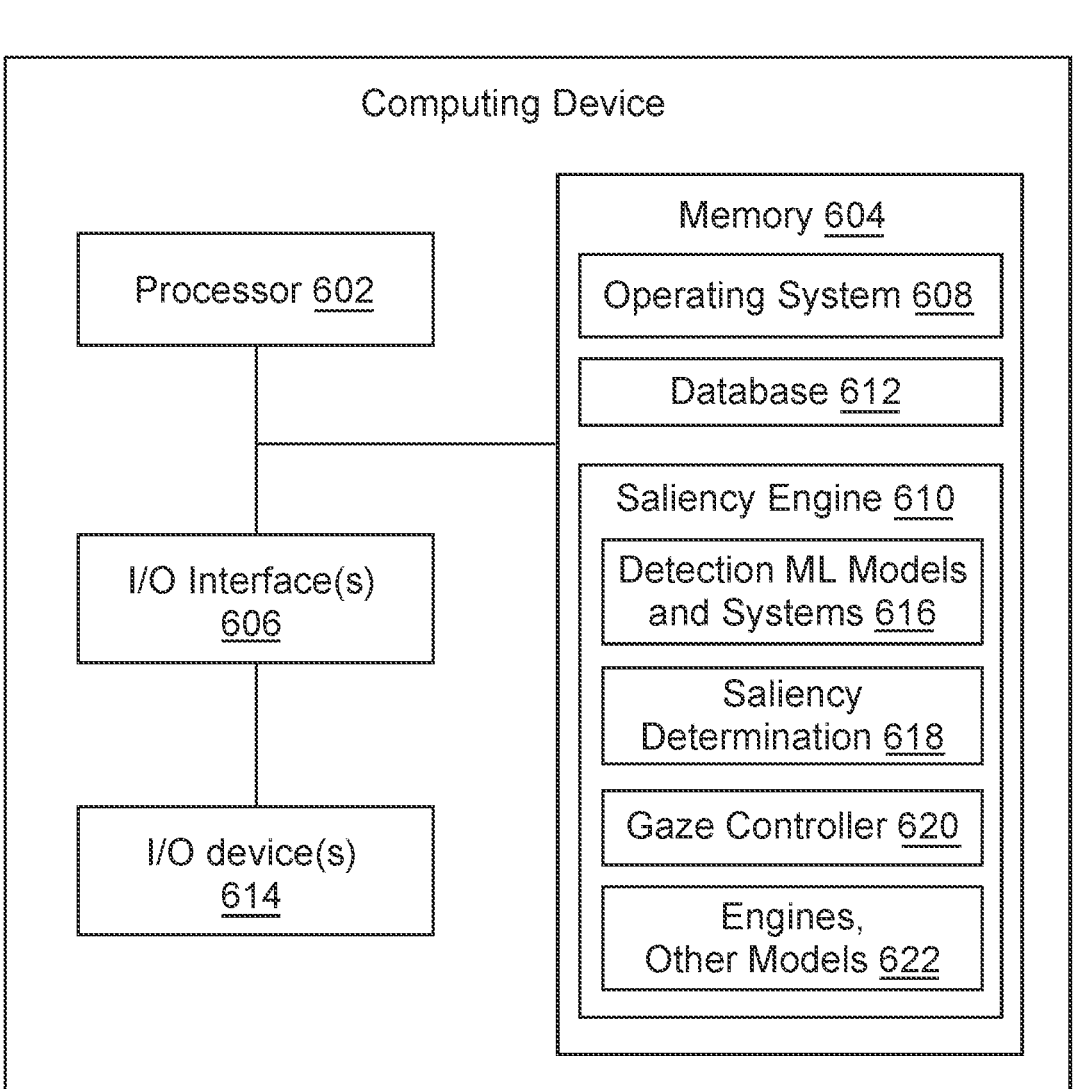
FIG. 6 is a block diagram illustrating an example computing device which may be used to implement one or more features described herein, in accordance with some implementations.

FIG. 6 is a block diagram of an example computing device 600 which may be used to implement one or more features described herein, in accordance with some implementations. In one example, device 600 may be used to implement a computer device (e.g., 102, 110, and/or 116 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 600 includes a processor 602, a memory 604, input/output (I/O) interface 606, and audio/video input/output devices 614 (e.g., display screen, touchscreen, display goggles or glasses, audio speakers, microphone, etc.).

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, a saliency engine 610, and associated data 612. In some implementations, saliency engine 610 (and/or other engines) can include instructions that enable processor 602 to perform functions described herein, e.g., some or all of the methods and implementations of FIGS. 2-5.

For example, memory 604 can include software instructions for saliency engine 610 that can provide object detection and saliency determination features as described herein, e.g., for an online metaverse platform 102 or other device or system. Any of software in memory 604 can alternatively be stored on any other suitable storage location or computer-readable medium. Various engines, modules, instructions, machine learning models, other models used in described features can be stored in memory 604 and/or other connected storage devices. For example, memory 604 can store detection machine learning models and systems 616 which can detect and provide object properties used to determine saliency factors (e.g., in blocks 204, 306, 506, etc.); a saliency determination block 618 which can determine saliency factors and/or saliency measures (e.g., in blocks 206, 208, 308-312, 508-512, etc.); a gaze controller 620 which can determine a gaze target and/or modify a gaze of an avatar or object (e.g., in blocks 318-324, etc.), and engines and other models 622 (e.g., metaverse engines, virtual experiences and games, etc.). In some implementations, an object determination module can perform object detection, saliency factor determination, and saliency measure determination for objects, e.g., using blocks 616 and 618.

Further, memory 604 and database 612 (and/or other connected storage device(s)) can store instructions and data used in the features described herein, e.g., object data (e.g., object properties including textures, 3D meshes, animations, etc., other object properties, object content, etc.), training data for ML models, virtual experience data and parameters, other parameters used by machine learning models, etc. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, gamepad or other game controller, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, software blocks 608 and 610, and database 612. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online metaverse platform 102 may be described as performing operations as described in some implementations herein, any suitable component or combination of components of online gaming platform 102 or similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, headset, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 200, 300, and/or 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
  determining, by at least one processor, a reference avatar in a virtual environment;
  obtaining, by the at least one processor, a plurality of properties of an object in the virtual environment, wherein the properties include at least one of: spatial properties within the virtual environment, visual properties, or audio properties;
  determining, by the at least one processor, a plurality of saliency factors of the object, wherein each saliency factor is normalized to a same numeric range and is based on a different set of one or more properties of the plurality of properties of the object, and wherein one or more of the saliency factors are additionally based on one or more properties of the reference avatar,
  wherein the plurality of saliency factors are based on at least one of:
    a distance of the object from the reference avatar when the object is in a field of view of the reference avatar, wherein the distance of the object is based on a location of the object in the virtual environment;
    an orientation of the object with respect to the reference avatar when the object is in the field of view of the reference avatar;

a visual content feature of the object that is a particular facial feature or particular facial expression of a face of the object, as classified by one or more machine learning models;
    a particular sound or type of sound emitted by the object in the virtual environment;
    one or more visual content features of the object that include content that is prohibited from display in the virtual environment; or
    combinations thereof;
  determining, by the at least one processor, a saliency measure of the object with respect to the reference avatar based on a combination of the plurality of saliency factors;
  determining, by the at least one processor, whether the saliency measure is greater than a threshold saliency measure associated with the reference avatar;
  in response to determining that the saliency measure is greater than the threshold saliency measure associated with the reference avatar, automatically modifying, by the at least one processor and without user input, at least one of the reference avatar or the object in the virtual environment; and
  in response to determining that the saliency measure is less than the threshold saliency measure associated with the reference avatar, omitting the modification of the at least one of the reference avatar or the object.

2. The computer-implemented method of claim 1, wherein the object is one of a plurality of objects in the virtual environment, and the method further comprises:
  determining a respective saliency measure associated with each object of the plurality of objects; and
  comparing the saliency measures of the objects,
  wherein modifying the at least one of the reference avatar and the object in the virtual environment includes automatically modifying the reference avatar, by the at least one processor and without user input, in response to determining that the saliency measure is greater than the threshold saliency measure associated with the reference avatar and that the saliency measure is a greatest of the saliency measures associated with the plurality of objects.

3. The computer-implemented method of claim 1, wherein modifying the at least one of the reference avatar or the object in the virtual environment includes automatically, without user input, moving one or more portions of the reference avatar to direct a gaze of the reference avatar toward the object.

4. The computer-implemented method of claim 1, wherein the spatial properties include at least one of:
  a location of the object in the virtual environment, or
  a velocity of the object in the virtual environment.

5. The computer-implemented method of claim 1, wherein the one or more properties of the reference avatar include a field of view of the reference avatar having an angular range and a direction.

6. The computer-implemented method of claim 1, wherein the plurality of saliency factors include a saliency factor based on a velocity of the object in the virtual environment when the object is in a field of view of the reference avatar.

7. The computer-implemented method of claim 1, wherein the plurality of saliency factors include a saliency factor based on a particular visual content feature of the object when the object is in a field of view of the reference avatar.

8. The computer-implemented method of claim 1, wherein the saliency measure is determined based on a weighted linear combination of the plurality of saliency factors, wherein at least one of the plurality of saliency factors is modified by a weight associated with the reference avatar or a weight associated with the virtual environment.

9. The computer-implemented method of claim 1, wherein modifying the at least one of the reference avatar or the object in the virtual environment includes automatically, without user input, moving one or more portions of the reference avatar based on a trajectory of the object in the virtual environment.

10. A system comprising:

at least one processor; and a memory coupled to the at least one processor, with software instructions stored thereon that, when executed by the at least one processor, cause the at least one processor to perform operations including:

determining a reference avatar in a virtual environment;

obtaining a plurality of properties of an object in the virtual environment, wherein the properties include at least one of: spatial properties within the virtual environment, visual properties, or audio properties;

determining a plurality of saliency factors of the object, wherein each saliency factor is normalized to a same numeric range and is based on a different set of one or more properties of the plurality of properties of the object, and wherein one or more of the saliency factors are additionally based on one or more properties of the reference avatar;

determining a saliency measure of the object with respect to the reference avatar based on a combination of the plurality of saliency factors, wherein the saliency measure is determined based on a weighted linear combination of the plurality of saliency factors, wherein at least one of the plurality of saliency factors is modified by a weight associated with the reference avatar or a weight associated with the virtual environment;

determining that the saliency measure is greater than a threshold saliency measure associated with the reference avatar;

in response to determining that the saliency measure is greater than the threshold saliency measure associated with the reference avatar, automatically modifying, without user input, at least one of the reference avatar or the object in the virtual environment; and in response to determining that the saliency measure is less than the threshold saliency measure associated with the reference avatar, omitting the modifying of the at least one of the reference avatar or the object.

11. The system of claim 10, wherein the one or more properties of the reference avatar include a field of view of the reference avatar having an angular range and a direction, and wherein the plurality of saliency factors include a saliency factor based on whether the object includes a particular visual content feature when the object is in the field of view of the reference avatar.

12. The system of claim 10, wherein the plurality of saliency factors include a saliency factor based on whether one or more visual features of the object include content that is prohibited from display in the virtual environment, and wherein the content is detected using one or more machine learning models.

13. The system of claim 10, wherein the plurality of saliency factors include a saliency factor based on a degree of prohibited content included in one or more visual features of the object, and wherein the prohibited content is prohibited from display in the virtual environment.

14. The system of claim 10, wherein the plurality of saliency factors include an audio saliency factor based on whether a particular sound emitted from the object in the virtual environment includes audio content that is prohibited in the virtual environment.

15. A non-transitory computer-readable medium with instructions stored thereon that, when executed by a processor, cause the processor to perform operations comprising:

determining a particular reference avatar in a virtual environment, wherein the particular reference avatar is one of a plurality of reference avatars associated with the virtual environment;

obtaining a plurality of properties of an object in the virtual environment, wherein the properties include at least one of: spatial properties within the virtual environment, visual properties, or audio properties;

determining a plurality of saliency factors of the object, wherein each saliency factor is normalized to a same numeric range and is based on a different set of one or more properties of the plurality of properties of the object, and wherein one or more of the saliency factors are additionally based on one or more properties of the particular reference avatar;

determining a saliency measure of the object with respect to the particular reference avatar based on a combination of the plurality of saliency factors;

determining whether the saliency measure is greater than a threshold saliency measure associated with the particular reference avatar, wherein the threshold saliency measure is based on particular settings associated with the particular reference avatar, and wherein one or more other reference avatars of the plurality of reference avatars are associated with respective threshold salience measures based on respective settings associated with each of the other reference avatars;

in response to determining that the saliency measure is greater than the threshold saliency measure associated with the particular reference avatar, automatically modifying, without user input, at least one of the particular reference avatar or the object in the virtual environment; and in response to determining that the saliency measure is less than the threshold saliency measure associated with the particular reference avatar, omitting the modification of the at least one of the particular reference avatar or the object.

16. The non-transitory computer-readable medium of claim 15, wherein the threshold saliency measure is variable and is additionally based on the object.

17. The non-transitory computer-readable medium of claim 15, wherein the threshold saliency measure is variable and is additionally based on a particular location or area in the virtual environment in which the particular reference avatar or the object are located.

18. The non-transitory computer-readable medium of claim 15, wherein the threshold saliency measure is variable and is additionally based on at least one of:

the object;

a particular location or area in the virtual environment in which the particular reference avatar or the object are located; or combinations thereof.

19. The non-transitory computer-readable medium of claim 15, wherein the saliency measure is determined based on a weighted linear combination of the plurality of saliency factors, and wherein at least one of the plurality of saliency factors is modified by a weight associated with the particular reference avatar or a weight associated with the virtual environment.

20. The non-transitory computer-readable medium of claim 15, wherein modifying the at least one of the particular reference avatar or the object in the virtual environment includes automatically, without user input, moving one or more portions of the particular reference avatar based on a trajectory of the object in the virtual environment.

* * * * *